US008067144B2

(12) United States Patent
Mizuhata et al.

(10) Patent No.: US 8,067,144 B2
(45) Date of Patent: Nov. 29, 2011

(54) POLYESTERS FOR TONER FOR ELECTROPHOTOGRAPHY

(75) Inventors: Hiroshi Mizuhata, Wakayama (JP); Takashi Kubo, Wakayama (JP); Takashi Mukai, Wakayama (JP); Hidehito Ikebata, Wakayama (JP); Katsutoshi Aoki, Wakayama (JP)

(73) Assignee: Kao Corporation, Tokyo (JP)

( * ) Notice: Subject to any disclaimer, the term of this patent is extended or adjusted under 35 U.S.C. 154(b) by 705 days.

(21) Appl. No.: 12/109,120

(22) Filed: Apr. 24, 2008

(65) Prior Publication Data

US 2008/0248414 A1 Oct. 9, 2008

Related U.S. Application Data

(63) Continuation-in-part of application No. 11/670,101, filed on Feb. 1, 2007, now abandoned.

(30) Foreign Application Priority Data

Mar. 14, 2006 (JP) ................................ 2006-068927

(51) Int. Cl.
*G03G 9/087* (2006.01)
*C08L 69/00* (2006.01)

(52) U.S. Cl. .................. 430/137.15; 430/109.4; 522/93; 525/442; 528/297; 528/300

(58) Field of Classification Search .................... 522/93; 525/442; 528/297, 300; 430/109.4, 137.15
See application file for complete search history.

(56) References Cited

U.S. PATENT DOCUMENTS

| | | | | |
|---|---|---|---|---|
| 5,294,682 | A * | 3/1994 | Fukuda et al. | 525/442 |
| 2003/0162115 | A1* | 8/2003 | Uchinokura et al. | 430/108.22 |
| 2005/0089787 | A1 | 4/2005 | Uchinokura et al. | |

FOREIGN PATENT DOCUMENTS

| | | |
|---|---|---|
| JP | 57-109825 | 7/1982 |
| JP | 11-305478 | 11/1999 |
| JP | 2000-35695 | 2/2000 |
| JP | 2002-258528 | 9/2002 |
| JP | 2004-198598 | 7/2004 |
| JP | 2005-148726 | 6/2005 |

OTHER PUBLICATIONS

U.S. Appl. No. 12/297,956, filed Oct. 21, 2008, Kubo, et al.

* cited by examiner

*Primary Examiner* — Hoa Le

(74) *Attorney, Agent, or Firm* — Oblon, Spivak, McClelland, Maier & Neustadt, L.L.P.

(57) ABSTRACT

The present invention relates to a polyester having an excellent hydrolysis resistance even when used in a process for producing a toner for electrophotography which includes a step of forming a raw material into particles in an aqueous medium, and a toner for electrophotography which contains the polyester and is excellent in storage stability and fixing property. There are provided a polyester for a toner for electrophotography which is used in a process for producing a toner including a step of forming a raw material component into particles in an aqueous medium or a solution, and produced by polycondensing an alcohol component with a carboxylic acid component containing at least one compound selected from the group consisting of an alkyl succinic acid and an alkenyl succinic acid, as well as a toner for electrophotography which contains the polyester.

13 Claims, No Drawings

POLYESTERS FOR TONER FOR ELECTROPHOTOGRAPHY

This is a Continuation-in-part application of application Ser. No. 11/670,101, filled on Feb. 1, 2007, which is still pending.

FIELD OF THE INVENTION

The present invention relates to polyesters for a toner for electrophotography which is employed in electrophotography, an electrostatic recording method, an electrostatic printing method or the like.

BACKGROUND OF THE INVENTION

In recent years, toners have been required to exhibit an excellent fixing property and have a smaller particle size from the viewpoint of achieving higher image qualities. As resin binders for the toners, there are known styrene-acrylic resins, polyesters, etc. In particular, the polyesters have been used because of excellent durability and fixing property thereof. As such a polyester, there has been disclosed the polyester containing an alkyl succinic acid and/or an alkenyl succinic acid having 10 or more carbon atoms as a carboxylic acid component thereof, in particular, in view of a good fixing property, and there has also been disclosed the toner using the polyester as a resin binder which is produced by a melt-kneading and pulverizing method (refer to JP 57-109825A and JP 2000-35695A). However, when a toner having a small particle size and using a resin binder containing a polyester as a main component is produced by the melt-kneading and pulverizing method, it tends to be difficult to control a particle size of the toner upon pulverization.

On the other hand, JP 2004-198598A discloses a process for producing a toner by an emulsification and aggregation method as a wet process.

However, when a toner containing a polyester as a resin binder is produced by the wet process, an ester bond of the polyester tends to be hydrolyzed in a solution. As a result, the obtained toner tends to exhibit a low glass transition point and therefore tends to be deteriorated in storage stability and fixing property.

SUMMARY OF THE INVENTION

Thus, the present invention relates to the following aspects (1) to (4):

(1) A polyester for a toner for electrophotography which is used in a process for producing the toner including a step of forming a raw material containing a resin binder containing the polyester into particles in an aqueous medium, wherein the polyester is produced by polycondensing an alcohol component with a carboxylic acid component containing at least one compound selected from the group consisting of an alkyl succinic acid and an alkenyl succinic acid;

(2) a toner for electrophotography containing the polyester as defined in the above aspect (1);

(3) a process for producing the polyester as defined in the above aspect (1), including the step of polycondensing an alcohol component with a carboxylic acid component containing at least twenty structural isomers selected from the group consisting of structural isomers of an alkyl succinic acid containing a branched alkyl group having 9 to 14 carbon atoms, and structural isomers of an alkenyl succinic acid containing a branched alkenyl group having 9 to 14 carbon atoms; and (4) a process for producing a toner for electrophotography, including the steps of:

(1) forming primary particles containing a resin binder containing the polyester as defined in the above aspect (1) in the presence of a nonionic surfactant in an aqueous medium; and (2) aggregating and unifying the primary particles.

DETAILED DESCRIPTION OF THE INVENTION

The present invention relates to a polyester having an excellent hydrolysis resistance even when used in a process for producing a toner for electrophotography which includes a step of forming a raw material into particles in an aqueous medium; and a toner for electrophotography which contains the polyester and is excellent in storage stability and fixing property.

[Polyester for Toner for Electrophotography]

The polyester for a toner for electrophotography according to the present invention (hereinafter occasionally referred to merely as a "polyester of the present invention") is used in a toner produced by the process including the step of forming a raw material containing a resin binder containing at least the polyester into particles in an aqueous medium, and the polyester is produced by polycondensing an alcohol component with a carboxylic acid component containing at least one compound selected from the group consisting of an alkyl succinic acid and an alkenyl succinic acid.

The polyester of the present invention exhibits an excellent hydrolysis resistance. Therefore, when the polyester is used as a raw material for a toner obtained by the process including the step of forming the raw material into particles in an aqueous medium, the resultant toner is enhanced in storage stability and fixing property. The reason why the hydrolysis resistance of the polyester as well as the storage stability and fixing property of the obtained toner are improved, is considered as follows. That is, the carboxylic acid component contains as a monomer, at least one compound selected from the group consisting an alkyl succinic acid and an alkenyl succinic acid which are constituted of many kinds of structural isomers in view of a molecular structure thereof, so that the polyester exhibits a large steric hindrance against hydrolysis of its portion near an ester bond thereof. As a result, when the polyester is formed into particles in an aqueous medium, the ester bond of the polyester is prevented from undergoing a hydrolysis. Therefore, the polyester having a broad molecular weight distribution can be included in a toner without deterioration in properties of the polyester resin.

In order to enhance the steric hindrance and prevent the hydrolysis, the alkyl succinic acid is preferably constituted from at least two kinds of alkyl succinic acids each containing a branched alkyl group having 9 to 14 carbon atoms, and the alkenyl succinic acid is preferably constituted from at least two kinds and more preferably at least three kinds of alkenyl succinic acids each containing a branched alkenyl group having 9 to 14 carbon atoms. The carboxylic acid component may be composed of either at least two kinds of alkyl succinic adds or at least two kinds of alkenyl succinic acids, solely. However, the at least two kinds of alkyl succinic acids and the at least two kinds of alkenyl succinic acids may be used in combination with each other. Specific examples of the branched alkyl or alkenyl group having 9 to 14 carbon atoms include isododecenyl and isododecyl. When using the carboxylic acid component containing the alkyl succinic acids which are different in carbon number of the alkyl group from each other and/or the alkenyl succinic acids which are different in carbon number of the alkenyl group from each other, the resultant polyester can be further improved in hydrolysis resistance, and the toner containing such a polyester can exhibit a very broad fixing range because it shows a broad endothermic peak near a glass transition point thereof, for example, as measured by a differential scanning calorimetry (DSC).

In view of enhancing a steric hindrance of the polyester and preventing a hydrolysis thereof to improve a storage stability of the obtained toner, the alkyl succinic acid preferably contains structural isomers of an alkyl succinic acid which are different in kind of the branched alkyl group having 9 to 14 carbon atoms from each other, and the alkenyl succinic acid preferably contains structural isomers of an alkenyl succinic acid which are different in kind of the branched alkenyl group having 9 to 14 carbon atoms from each other. Also, the alkyl succinic acid and/or the alkenyl succinic acid preferably contain 20 kinds or more, more preferably 25 kinds or more and even more preferably 30 kinds or more of structural isomers of the respective acids. Namely, the carboxylic acid component also preferably contains 20 kinds or more, more preferably 25 kinds or more and even more preferably 30 kinds or more of structural isomers selected from structural isomers of the alkyl succinic acid and structural isomers of the alkenyl succinic add.

Meanwhile, in the present invention, the structural isomers of the alkyl succinic acid or alkenyl succinic acid which are different in kind of the alkyl group or alkenyl group bonded thereto from each other, are regarded as separate alkyl succinic acids or separate alkenyl succinic acids.

In addition, in view of enhancing a steric hindrance of the polyester and preventing a hydrolysis thereof to improve a storage stability and a fixing property of the obtained toner, the alkyl succinic acid and the alkenyl succinic acid are preferably produced from a compound having alkylene group (alkylene compound), and maleic acid and/or fumaric acid, and more preferably from an alkylene compound and maleic acid. As the alkylene compound, there are preferably used those alkylene compounds having 9 to 14 carbon atoms. Specific examples of the preferred alkylene compound include those compounds obtained from ethylene, propylene, isobutylene, n-butylene, etc., for example, trimers or tetramers thereof. Also, the alkylene compound preferably exhibits 20 or more peaks, more preferably 25 or more peaks and even more preferably 30 or more peaks corresponding to alkylene compounds having 9 to 14 carbon atoms as measured under the below-mentioned conditions by gas chromatography/mass spectrometry.

It is considered that these peaks observed in the gas chromatography/mass spectrometry are derived from structural isomers of the alkylene compound. Therefore, the alkyl succinic acid or the alkenyl succinic acid produced from the alkylene compound constituted of a predetermined number or more of structural isomers thereof as a raw material also include the similar structural isomers. The polyester obtained from the alkyl succinic acid and/or the alkenyl succinic acid containing a predetermined number or more of these structural isomers has an excellent hydrolysis resistance owing to an extremely high steric hindrance thereof, and the toner containing such a polyester can be further improved in storage stability and fixing property. Meanwhile, in view of the objects aimed by the present invention, the numbers of the structural isomers and peaks both are preferably as large as possible. However, the upper limits of the numbers of the structural isomers and peaks will be determined by limited arithmetic combination thereof.

The alkyl succinic acid and/or the alkenyl succinic acid may be produced by mixing the above known alkylene compound with maleic add and/or fumaric acid, and heating the mixture to cause an ene reaction therebetween. In view of facilitated production, there is preferably used the method of mixing the known alkylene compound with maleic acid and heating the mixture to cause an ene reaction therebetween. The alkyl succinic acid containing a branched alkyl group having 9 to 14 carbon atoms and/or the alkenyl succinic acid containing a branched alkenyl group having 9 to 14 carbon atoms may be produced by known methods. For example, there may be used the method of suitably selecting a raw material used for synthesis of the alkylene compound as well as kind of a catalyst, the method of controlling a reaction rate, a reaction time, a reaction pressure, a solvent or the like for the synthesis, or the method of controlling distillation conditions upon production of the alkyl succinic acid and/or the alkenyl succinic acid (refer to JP 48-23405A, JP 48-23404A, U.S. Pat. No. 3,374,285, etc.).

Examples of the suitable raw material used for synthesizing the alkylene compound include those branched alkylene compounds such as propylene and isobutylene. Among these alkylene compounds, preferred is propylene having a small molecular weight in view of increasing the number of structural isomers contained therein.

Examples of the suitable catalyst used for synthesizing the alkylene compound include liquid phosphoric acid, solid phosphoric acid, tungsten and boron trifluoride complexes. Meanwhile, in view of facilitated control of the number of the structural isomers, there is preferably used the method of controlling the number of the structural isomers contained in the alkylene compound by distillation after random polymerization thereof.

In the carboxylic acid component as a raw monomer of the polyester of the present invention, a total content of the alkyl succinic acid and/or the alkenyl succinic acid is preferably from 3 to 50 mol %, more preferably from 4 to 45 mol % and even more preferably from 5 to 40 mol % in view of a good hydrolysis resistance of the polyester as well as good fixing property and storage stability of the resultant toner.

In the present invention, as the carboxylic acid component, the alkyl succinic acid and/or the alkenyl succinic acid may also be used together with the other divalent or trivalent or more carboxylic acid. Examples of the divalent carboxylic acid include aromatic dicarboxylic acids such as phthalic acid, isophthalic acid and terephthalic acid; aliphatic dicarboxylic acids such as oxalic acid, malonic acid, maleic acid, fumaric acid, citraconic acid, itaconic acid, glutaconic acid, succinic acid, adipic acid and succinic acids substituted with an alkyl group having 1 to 7 carbon atoms or 15 or more carbon atoms or an alkenyl group having 2 to 7 carbon atoms or 15 or more carbon atoms; and anhydrides and alkyl ($C_1$ to $C_3$) esters of these acids. Among these carboxylic acids, in view of good durability, fixing property and dispersibility of a colorant, preferred are aromatic dicarboxylic adds.

Examples of the trivalent or more polycarboxylic acid include aromatic carboxylic acids such as 1,2,4-benzenetricarboxylic acid (trimellitic acid), 2,5,7-naphthalene-tricarboxylic acid and pyromellitic acid; and derivatives of these acids such as anhydrides and alkyl ($C_1$ to $C_3$) esters of these acids.

Among the above dicarboxylic acid compounds, in view of good chargeability and fixing property, preferred are terephthalic acid and isophthalic acid. Also, among the above trivalent or more polycarboxylic acid compounds, in view of low costs and facilitated control of the reaction, preferred are trimellitic acid and acid anhydrides thereof.

Meanwhile, in the present invention, the carboxylic adds, carboxylic acid anhydrides and carboxylic acid alkyl esters are hereinafter referred to totally as "carboxylic acid compounds".

Examples of the alcohol component as a raw monomer of the polyester of the present invention include diols such as an alkylene oxide adduct of bisphenol A such as polyoxypropylene-2,2-bis(4-hydroxyphenyl)propane and polyoxyethylene-2,2-bis(4-hydroxyphenyl)propane, ethylene glycol, 1,2-propylene glycol, 1,3-propanediol, 1,4-butanediol, 2,3-butanediol, neopentyl glycol, polyethylene glycol, polypropylene glycol, bisphenol A and hydrogenated bisphenol A; and trivalent or more polyhydric alcohols such as sorbitol, pentaerythritol, glycerol and trimethylol propane. Among these alcohol components, in view of a good chargeability, preferred are aromatic alcohols such as an alkylene oxide adduct of bisphenol A.

The alcohol component and the carboxylic acid component are preferably subjected to polycondensation reaction in the presence of an esterification catalyst. Examples of the esterification catalyst suitably used in the polycondensation reaction include titanium compounds and tin (II) compounds containing no Sn—C bond. These titanium and tin compounds as the esterification catalyst may be used alone or in combination thereof.

The titanium compound preferably includes titanium compounds having a Ti—O bond and more preferably titanium compounds containing an alkoxy group, an alkenyloxy group or an acyloxy group having 1 to 28 carbon atoms in total.

Specific examples of the titanium compound include titanium diisopropylate bis(triethanol aminate) $[Ti(C_6H_{14}O_3N)_2(C_3H_7O)_2]$, titanium diisopropylate bis(diethanol aminate) $[Ti(C_4H_{10}O_2N)_2(C_3H_7O)_2]$, titanium dipentylate bis(triethanol aminate) $[Ti(C_6H_{14}O_3N)_2(C_5H_{11}O)_2]$, titanium diethylate bis(triethanol aminate) $[Ti(C_6H_{14}O_3N)_2(C_2H_5O)_2]$, titanium dihydroxyoctylate bis(triethanol aminate) $[Ti(C_6H_{14}O_3N)_2(OHC_8H_{16}O)_2]$, titanium distearate bis (triethanol aminate) $[Ti(C_6H_{14}O_3N)_2(C_{18}H_{37}O)_2]$, titanium triisopropylate triethanol aminate $[Ti(C_6H_{14}O_3N), (C_3H_7O)_3]$ and titanium monopropylate tris(triethanol aminate) $[Ti(C_6H_4O_3N)_3(C_3H_7O)_1]$. Among these titanium compounds, preferred are titanium diisopropylate bis(triethanol aminate), titanium diisopropylate bis(diethanol aminate) and titanium dipentylate bis(triethanol aminate). These titanium compounds are also available, for example, as commercial products marketed from Matsumoto Kosho Co., Ltd.

Specific examples of the other suitable titanium compounds include tetra-n-butyl titanate $[Ti(C_4H_9O)_4]$, tetrapropyl titanate $[Ti(C_3H_7O)_4]$, tetrastearyl titanate $[Ti(C_{18}H_{37}O)_4]$, tetramyristyl titanate $[Ti(C_{14}H_{29}O)_4]$, tetraoctyl titanate $[Ti(C_8H_{17}O)_4]$, dioctyldihydroxyoctyl titanate $[Ti(C_8H_{17}O)_2(OHC_8H_{16}O)_2]$ and dimyristyl dioctyl titanate $[Ti(C_{14}H_{29}O)_2(C_8H_{17}O)_2]$. Among these other suitable titanium compounds, preferred are tetrastearyl titanate, tetramyristyl titanate, tetraoctyl titanate and dioctyldihydroxyoctyl titanate. These titanium compounds may be produced, for example, by reacting a titanium halide with a corresponding alcohol, and are also available as commercial products marketed from Nisso Co., Ltd.

Examples of the preferred tin (II) compound containing no Sn—C bond include tin (II) compounds having a Sn—O bond and tin (II) compounds having a Sn—X bond wherein X represents a halogen atom. Among these tin compounds, preferred are tin (II) compounds having a Sn—O bond.

Examples of the tin (II) compound having a Sn—O bond include tin (II) carboxylates containing a carboxyl group having 2 to 28 carbon atoms such as tin (II) oxalate, tin (II) diacetate, tin (II) dioctanoate, tin (II) dilaurate, tin (II) distearate and tin (II) dioleate; dialkoxy tin (II) containing an alkoxy group having 2 to 28 carbon atoms such as dioctyloxy tin (II), dilauryloxy tin (II), distearoxy tin (II) and dioleyloxy tin (II); tin (II) oxide; and tin (II) sulfate. Examples of the tin (II) compounds having a Sn—X bond wherein X represents a halogen atom include tin (II) halides such as tin (II) chloride and tin (II) bromide. Among these tin (II) compounds, in view of a good charging raise-up effect and a good catalyst performance, preferred are fatty acid tin (II) salts represented by the formula: $(R^1COO)_2Sn$ wherein $R^1$ is an alkyl or alkenyl group having 5 to 19 carbon atoms, dialkoxy tin (II) compounds represented by $(R^2O)_2Sn$ wherein $R^2$ is an alkyl or alkenyl group having 6 to 20 carbon atoms, and tin (II) oxide represented by the formula: SnO, more preferred are fatty acid tin (II) salts represented by the formula: $(R^1COO)_2Sn$ and tin (II) oxide, and even more preferred are tin (II) dioctanoate, tin (II) distearate and tin (II) oxide.

The above titanium compounds and the tin (II) compounds may be respectively used in combination of any two or more thereof.

The amount of the esterification catalyst being present in the reaction system is preferably from 0.01 to 1.0 part by weight and more preferably from 0.1 to 0.6 part by weight on the basis of 100 parts by weight of the total amount of the alcohol component and the carboxylic acid component.

The polycondensation of the alcohol component and the carboxylic acid component may be carried out, for example, at a temperature of 180 to 250° C. in an inert gas atmosphere in the presence of the above esterification catalyst.

The softening point of the polyester for a toner for electrophotography according to the present invention is preferably from 80 to 160° C., more preferably from 85 to 150° C., even more preferably from 90 to 145° C. and further even more preferably from 95 to 140° C. in view of a good fixing property and a good durability.

The glass transition point of the polyester is preferably from 40 to 70° C., more preferably from 45 to 70° C. and even more preferably from 50 to 67° C. in view of a good fixing property and a good durability. The softening point and the glass transition point of the polyester can be readily controlled by suitably adjusting a composition of the raw monomers, a kind of polymerization initiator used, a molecular weight and an amount of catalyst used and adequately selecting the reaction conditions.

When the polyester has a high acid value, the resin itself exhibits a high affinity to water and, therefore, tends to undergo hydrolysis. In view of a good chargeability and a good hydrolysis resistance, the acid value of the polyester is preferably from 1 to 40 mg KOH/g, more preferably from 2 to 35 mg KOH/g and even more preferably from 3 to 30 mg KOH/g.

[Toner for Electrophotography]

The toner for electrophotography according to the present invention is produced by the process including a step of forming a raw material containing the polyester of the present invention as a resin binder and, if required, additives such as a colorant, into particles in an aqueous medium. The resin binder may also contain other resins. The content of the polyester of the present invention in the toner is preferably from 40 to 100% by weight, more preferably from 50 to 100% by weight, even more preferably from 60 to 100% by weight and further even more preferably from 70 to 100% by weight.

In the toner for electrophotography according to the present invention, from the viewpoint of a good fixing property of the toner, crystalline polyesters are preferably used as the above other resins contained in the resin binder. The crystalline polyesters are generally produced from an aliphatic monomer as a raw material. Therefore, when used for chemical toners, the crystalline polyesters tend to be hydrolyzed upon emulsification, so that a glass transition point (Tg) thereof tends to be decreased, resulting in deteriorated storage stability of the obtained toner. On the other hand, in the present invention, the resin binder is mainly composed of a resin produced from a monomer such as the specific alkenylsuccinic acid which has a long-chain alkyl moiety in a side chain thereof. Therefore, the resin binder has an enhanced affinity to the crystalline polyesters owing to the presence of the long-chain alkyl moiety contained in the side chain of the resin, and hydrolysis of the crystalline polyesters is inhibited by a hydrophobic effect thereof. As a result, the obtained toner can exhibit an excellent low-temperature fixing property owing to the crystalline polyesters while maintaining a good storage stability of the toner.

Meanwhile, the polyester of the present invention is preferably an amorphous polyester from the viewpoints of a good storage stability and a good durability of the resultant toner. In the present invention, the "amorphous polyester" means those polyesters having a ratio of a softening point to an endothermic maximum peak temperature (softening point/endothermic maximum peak temperature) of preferably more than 1.3 but not more than 4, and more preferably from 1.5 to 3. Whereas, the "crystalline polyester" used herein means those polyesters having a ratio of a softening point to an endothermic maximum peak temperature (softening point/endothermic maximum peak temperature) of preferably from 0.6 to 1,3, more preferably from 0.9 to 1.2, even more preferably from 0.9 to 1.1 and further even more preferably from 0.98 to 1.05. The ratio of a softening point to an endothermic maximum peak temperature of the polyester may be adjusted by suitably selecting the kinds and ratios of the raw monomers used, molecular weights of the polyester as well as production conditions thereof (such as, for example, cooling rate).

In the present invention, the crystalline polyester is preferably such a resin obtained by polycondensing an alcohol component containing 80 mol % or more of an aliphatic diol preferably having 2 to 9 carbon atoms, more preferably 2 to 6 carbon atoms and even more preferably 4 to 6 carbon atoms with a carboxylic acid component containing 80 mol % or more of an aliphatic dicarboxylic acid compound preferably having 2 to 8 carbon atoms, more preferably 4 to 6 carbon atoms and most preferably 4 carbon atoms.

Examples of the aliphatic diols having 2 to 9 carbon atoms include 1,4-butanedoil, ethylene glycol, 1,2-propylene glycol, 1,3-propylene glycol, 1,6-hexanediol, neopentyl glycol, 1,4-butenediol, 1,5-pentanediol, 1,7-heptanediol, 1,8-octanediol and 1,9-nonanediol. Among these aliphatic diols, especially preferred are $\alpha,\omega$-linear alkyl diols.

The content of the aliphatic diols having 2 to 9 carbon atoms in the alcohol component is preferably 80 mmol % or more, more preferably from 90 to 100 mol % and even more preferably from 95 to 100 mol %. In particular, one aliphatic diol among these aliphatic diols is contained in an amount of preferably 70 mol % or more, more preferably 80 mol % or more and even more preferably from 85 to 95 mol % on the basis of a total amount of the alcohol component.

Examples of divalent alcohols or tri- or more-valent polyhydric alcohols other than the aliphatic diols having 2 to 9 carbon atoms which may be contained in the alcohol component include the same alcohols as used for producing the above polyester of the present invention.

Also, examples of the aliphatic dicarboxylic acid compounds having 2 to 8 carbon atoms include oxalic acid, malonic acid, maleic acid, fumaric acid, citraconic acid, itaconic acid, glutaconic acid, succinic acid, adipic acid, 1,10-decanedicarboxylic acid, and anhydrides and alkyl ($C_1$ to $C_3$) esters of these adds. Meanwhile, the aliphatic dicarboxylic acid compounds used herein mean aliphatic dicarboxylic acids as well as anhydrides and alkyl ($C_1$ to $C_3$) esters of the acids as described above. Among these compounds, preferred are the aliphatic dicarboxylic acids.

The content of the aliphatic dicarboxylic acid compounds having 2 to 8 carbon atoms in the carboxylic acid component is preferably 80 mol % or more, more preferably from 90 to 100 mol % and even more preferably from 95 to 100 mol %. In particular, one kind of aliphatic dicarboxylic acid compound among these aliphatic dicarboxylic acid compounds is preferably contained in an amount of 80 mol % or more and more preferably from 90 to 100 mol % on the basis of a total amount of the carboxylic acid component.

Examples of divalent carboxylic adds other than the aliphatic dicarboxylic acid compounds having 2 to 8 carbon atoms which may be contained in the carboxylic acid component include aromatic carboxylic acids such as phthalic acid, isophthalic acid and terephthalic acid aliphatic carboxylic acids such as sebacic acid, azelaic acid, n-dodecylsuccinic acid and n-dodecenylsuccinic acid; alicyclic carboxylic acids such as cyclohexanedicarboxylic acid; and anhydrides and alkyl ($C_1$ to $C_3$) esters of these acids.

Examples of tri- or more-valent polycarboxylic acids which may be contained in the carboxylic acid component include aromatic carboxylic acids such as 1,2,4-benzenetricarboxylic acid (trimellitic acid), 2,5,7-naphthalenetricarboxylic acid, 1,2,4-naphthalenetricarboxylic acid and pyromellitic acid; aliphatic carboxylic acids such as 1,2,4-butanetricarboxylic acid, 1,2,5-hexanetricarboxylic acid, 1,3-dicarboxyl-2-methyl-2-methylenecarboxypropane, tetra (methylenecarboxyl)methane and 1,2,7,8-octanetetracarboxylic acid; alicyclic carboxylic acids such as 1,2,4-cyclohexanetricarboxylic acid; and derivative of these acids such as anhydrides and alkyl ($C_1$ to $C_3$) esters thereof.

When producing the crystalline polyester, the temperature used upon the polycondensation between the alcohol component and the carboxylic acid component is preferably from 120 to 230° C. The polycondensation between the alcohol component and the carboxylic acid component may be carried out in the same manner as used for producing the above amorphous polyester. Further, in order to enhance a strength of the obtained resin, there may also be used the method of charging the whole monomers at one time, or in order to reduce a content of low-molecular weight components, there may be used the method of first reacting divalent monomers, and then adding 3- or more-valent monomers to the resultant reaction product and reacted therewith. Further, the polycondensation reaction may be promoted by keeping the reaction system under a reduced pressure condition at a rear stage of the polymerization.

In addition, in order to obtain the crystalline polyester having a higher molecular weight, the molar ratio between the carboxylic acid component and the alcohol component may be controlled as described above, or the suitable reaction conditions such as increase in reaction temperature, increase in amount of the catalyst used, and long dehydration reaction time under reduced pressure may be appropriately selected. Meanwhile, the crystalline polyester having a higher molecular weight and a high viscosity may be produced under a high stirring power. However, when producing such a crystalline polyester without selecting any particular production facilities, the method of reacting the raw monomers in the presence of a non-reactive low-viscosity resin or a solvent is also an effective method.

The softening point of the crystalline polyester is preferably from 70 to 140° C. and more preferably from 80 to 130° C. from the viewpoint of a good low-temperature fixing property of the obtained toner.

The content of the crystalline polyester in the resin binder is preferably from 1 to 20% by weight, more preferably from 3 to 15% by weight and even more preferably from 4 to 10% by weight from the viewpoints of a good low-temperature fixing property and a good storage stability of the obtained toner.

Further, the toner of the present invention may also contain appropriate additives such as a charge controlling agent, a releasing agent, a conductivity controlling agent, an extender pigment, a reinforcing filler such as fibrous substances, an antioxidant and an anti-aging agent.

The colorant is not particularly limited, and may be appropriately selected from known colorants according to the aims or requirements. Specific examples of the colorant include various pigments such as carbon blacks, inorganic composite oxides, Chrome Yellow, Hansa Yellow, Benzidine Yellow, Threne Yellow, Quinoline Yellow, Permanent Orange GTR, Pyrazolone Orange, Vulcan Orange, Watchung Red, Permanent Red, Brilliant Carmine 3B, Brilliant Carmine 6B, DuPont Oil Red, Pyrazolone Red, Lithol Red, Rhodamine B Lake, Lake Red C, red iron oxide, Aniline Blue, ultramarine blue, Calco Oil Blue, Methylene Blue Chloride, Phthalocyanine Blue, Phthalocyanine Green and Malachite Green Oxalate; and various dyes such as acridine dyes, xanthene dyes, azo dyes, benzoquinone dyes, azine dyes, anthraquinone dyes, indigo dyes, thioindigo dyes, phthalocyanine dyes, Aniline Black dyes, polymethine dyes, triphenylmethane dyes, diphenylmethane dyes, thiazine dyes and thiazole dyes. These colorants may be used alone or in combination of any two or more thereof. The content of the colorant in the toner is preferably from 0.1 to 20 parts by weight and more preferably from 1 to 10 parts by weight on the basis of 100 parts by weight of the resin binder.

Examples of the charge controlling agent include chromium-based azo dyes, iron-based azo dyes, aluminum-based azo dyes and metal complexes of salicylic acid. The content of the charge controlling agent is preferably from 0.1 to 8 parts by weight and more preferably from 0.5 to 7 parts by weight on the basis of 100 parts by weight of the resin binder. These charge controlling agents may be used alone or in combination of any two or more thereof.

Examples of the releasing agent include polyolefin waxes, paraffin waxes and silicones; fatty acid amides such as oleamide, erucamide, ricinolamide and stearamide; vegetable waxes such as carnauba wax, rice wax, candelilla wax, haze wax and jojoba oil; animal waxes such as beeswax; and mineral and petroleum waxes such as montan wax, ozokerite, ceresin, microcrystalline wax, and Fischer-Topsch wax. These releasing agents can be used alone or in combination of any two or more thereof. The melting point of the releasing agent is preferably from 60 to 140° C. and more preferably from 60 to 100° C. in view of a good fixing property and a good anti-offset property.

The content of the wax in the toner is preferably from 0.5 to 10 parts by weight, more preferably from 1 to 8 parts by weight and even more preferably from 1.5 to 7 parts by weight on the basis of 100 parts by weight of the resin binder in view of a good dispersibility in the resin binder.

The method for producing the toner for electrophotography according to the present invention is not particularly limited as long as the method includes a step of forming a raw material containing the resin binder containing the polyester of the present invention into particles in an aqueous medium. Specific examples of the method for producing the toner of the present invention include a method of dissolving or dispersing a raw material containing the resin binder in an organic solvent to prepare a mixed solution, introducing the mixed solution into an aqueous medium to form fine particles by suspension granulation, and aggregating the fine particles; a method of emulsion-polymerizing a radical-polymerizable monomer solution in which the resin binder is dissolved to obtain fine resin particles, and fusing the fine resin particles together in an aqueous medium (refer to JP 2001-42568A); a method of dispersing a heated resin melt composed of a raw material containing the resin binder in an aqueous medium containing no organic solvent while keeping the resin in a molten state and then drying the obtained resin particles (refer to JP 2001-235904A). Namely, the particle-forming method used in the present invention includes 1) the method of forming fine particles and then aggregating and unifying the fine particles; 2) the method of forming fine particles and then fusing the fine particles together; and 3) the method of dispersing a raw material containing the resin binder. Among these methods, the method including (1) a step of forming primary particles containing at least the resin binder in an aqueous medium in the presence of a nonionic surfactant; and (2) a step of aggregating and unifying the primary particles is preferred.

When the resin binder containing the polyester of the present invention is mixed with the nonionic surfactant, the obtained mixture exhibits a low viscosity, thereby enabling the resin binder to be formed into fine particles. The decrease in viscosity of the mixture is caused owing to decrease in apparent softening point of the resin by compatilizing the resin binder with the nonionic surfactant. By utilizing this phenomenon, the apparent softening point of the resin binder compatilized with the nonionic surfactant can be decreased to a boiling point of water or lower. As a result, even the resin binder having a melting point or a softening point of 100° C. or higher as that of the resin solely may be formed into a water dispersion thereof by dropping water thereto under normal pressure. This method may be carried out in the presence of at least water and the nonionic surfactant and is therefore applicable to resins that are insoluble in an organic solvent. In addition, the method needs neither facilities for recovering the organic solvent and maintaining working environments nor special equipments that will be required upon employing mechanical means, resulting in such an advantage that the resin dispersion can be produced in an economical manner.

Therefore, although the aqueous medium may contain a solvent such as an organic solvent, the content of water in the aqueous medium is preferably 50% by weight or more, more preferably 70% by weight or more, even more preferably 90% by weight more and further even more preferably 99% by weight or more. According to the above method, the resin binder can be formed into fine particles using water solely using substantially no organic solvent. Meanwhile, if any solvent is used, in view of a dissolvability of the resin in the solvent, preferred solvents are methyl ethyl ketone, tetrahydrofuran, toluene, ethyl acetate, etc.

Examples of the nonionic surfactant include polyoxyethylene alkyl allyl ethers or polyethylene alkyl ethers such as polyoxyethylene nonylphenyl ether, polyoxyethylene oleyl ether and polyoxyethylene lauryl ether; polyethylene sorbitan esters such as polyethylene sorbitan monolaurate and polyoxyethylene sorbitan monostearate; polyoxyethylene fatty acid esters such as polyethylene glycol monolaurate, polyethylene glycol monostearate and polyethylene glycol monooleate; and oxyethylene/oxypropylene block copolymers. The nonionic surfactant may be used in combination with an anionic surfactant or a cationic surfactant.

The nonionic surfactant is preferably selected from those having a good compatibility with the resin used in the toner. In order to obtain a stable dispersion of the resin binder, the nonionic surfactant preferably has a HLB value of 12 to 18. More preferably, two or more kinds of nonionic surfactants which are different in HLB from each other are used depending upon the resin binder used. For example, when using the resin having a high hydrophilicity, the use of at least one kind of nonionic surfactant having a HLB value of 12 to 18 may be sufficient to obtain a stable dispersion thereof. On the other hand, when using the resin having a high hydrophobicity, the nonionic surfactant having a low HLB value, for example, a HLB value of about 7 to 10, is preferably used in combination with the nonionic surfactant having a high HLB value, for example, a HLB value of 14 to 20 so as to control a weighted mean HLB value of both the nonionic surfactants to 12 to 18. In this case, it is suggested that the nonionic surfactant having a HLB value of about 7 to 10 serves for allowing the resin to become compatilizable therewith, whereas the nonionic surfactant having a higher HLB value serves for stabilizing dispersion of the resin in water.

Also, when using the colorant, the nonionic surfactant is preferably absorbed in the colorant and dispersed in the resin binder. When the HLB value of the nonionic surfactant is controlled to the above specified range, the nonionic surfactant tends to be readily absorbed onto a surface of the colorant, and simultaneously the colorant tends to be present in a more stable state in the resin binder as compared to a colloid dispersion in the aqueous medium.

When the resin binder is formed into fine particles in water under normal pressure, the cloud point of the nonionic surfactant is preferably from 70 to 105° C. and more preferably from 80 to 105° C.

The amount of the nonionic surfactant used is preferably 5 parts by weight or more on the basis of 100 parts by weight of the resin binder in view of decreasing a melting point of the resin binder, and is preferably 80 parts by weight or less on the basis of 100 parts by weight of the resin binder in view of controlling the amount of the nonionic surfactant remaining in the toner. Therefore, in view of achieving both the requirements, the amount of the nonionic surfactant used is preferably in the range of from 5 to 80 parts by weight, more preferably from 10 to 70 parts by weight and even more preferably from 20 to 60 parts by weight on the basis of 100 parts by weight of the resin binder.

In the step (1), when the primary particles containing the resin binder is formed in the aqueous medium in the presence of the nonionic surfactant, the temperature in the reaction system may be suitably controlled within ±10° C., more preferably ±8° C. and even more preferably ±5° C. of the cloud point of the nonionic surfactant in view of preventing the nonionic surfactant from being deteriorated in dispersion performance and dispersion efficiency thereof.

In the step (1), it is preferred that a mixture of the resin binder and the nonionic surfactant is stirred, and an aqueous medium such as preferably deionized water and distilled water is dropped to the mixture while keeping the reaction system in a uniformly mixed state. Meanwhile, when using the colorant, care should be taken so as not to separate the resin binder containing the colorant compatilized with the nonionic surfactant from water.

The amount of the aqueous medium used is preferably from 100 to 3000 parts by weight, more preferably from 400 to 3000 parts by weight and even more preferably from 800 to 3000 parts by weight on the basis of 100 parts by weight of the resin binder in view of attaining uniformly aggregated particles in the subsequent step.

The particle size of the primary particles containing the resin binder containing the polyester of the present invention may be controlled by adjusting the amount of the nonionic surfactant added, the degree of agitation, the feed rate of water added, etc. In the step (1), the feed rate of the aqueous medium added to the mixture containing at least the resin binder and the nonionic surfactant is preferably from 0.1 to 50 g/min, more preferably from 0.5 to 40 g/min and even more preferably from 1 to 30 g/min per 100 g of the mixture in view of obtaining uniform primary particles.

Meanwhile, in the case where the resin binder contains an acid group such as a carboxyl group and a sulfonic group, water may be added to the mixture after or while neutralizing a part or whole of the resin binder. When using the resin binder containing an acid group, the particle size of the primary particles may be controlled by such factors including not only properties of the nonionic surfactant used but also a self-emulsifiability of the resin.

In the present invention, a dispersant may be used for the purposes of reducing a melt-viscosity and a melting point of the resin binder as well as enhancing a dispersibility of the primary particles produced. Examples of the dispersant include water-soluble polymers such as polyvinyl alcohol, methyl cellulose, ethyl cellulose, hydroxyethyl cellulose, carboxymethyl cellulose, sodium polyacrylate and sodium polymethacrylate; anionic surfactants such as sodium dodecylbenzenesulfonate, sodium octadecyl sulfate, sodium oleate, sodium laurate and potassium stearate; cationic surfactants such as laurylamine acetate, stearylamine acetate and lauryltrimethyl ammonium chloride; amphoteric surfactants such as lauryldimethylamine oxide; and inorganic salts such as tricalcium phosphate, aluminum hydroxide, calcium sulfate, calcium carbonate and barium carbonate. The amount of the dispersant used is preferably 20 parts by weight or less, more preferably 15 parts by weight or less and even more preferably 10 parts by weight or less on the basis of 100 parts by weight of the resin binder in view of a good emulsification stability and a good washability.

The solid content in the reaction system upon preparing a dispersion of the primary particles is preferably from 7 to 50% by weight, more preferably from 7 to 40% by weight and even more preferably from 10 to 30% by weight in view of a good stability of the dispersion as well as a good handling property of the dispersion in the aggregating step. Meanwhile, the solid component includes non-volatile components such as the resin and the nonionic surfactant.

The average particle size of the primary particles is preferably from 0.05 to 3 μm, more preferably from 0.05 to 1 μm and even more preferably from 0.05 to 0.8 μm in view of uniformly aggregating the particles in the subsequent step. The average particle size of the primary particles used in the present invention means a volume-median particle diameter ($D_{50}$) which may be measured by a laser diffraction type particle size measuring apparatus, etc. Meanwhile, the volume-median particle diameter ($D_{50}$) used herein means a particle size at which a cumulative volume frequency calculated on the basis of volume fraction from a smaller particle size side is 50%.

Successively, the primary particles obtained in the step (1) were subjected to aggregating and unifying step (step (2)).

In the step (2), the solid content in the reaction system upon subjecting the primary particles to the aggregating step for aggregating the primary particles may be controlled by adding water to a dispersion of the resin binder, and is preferably from 5 to 50% by weight, more preferably from 5 to 30% by weight and even more preferably from 5 to 20% by weight in order to allow the primary particles to be uniformly aggregated together.

The pH of the reaction system in the aggregating step is preferably from 2 to 10, more preferably from 2 to 9 and even more preferably from 3 to 8 in view of satisfying both a dispersion stability of the mixed solution and an aggregating property of the fine particles such as the resin binder.

The temperature of the reaction system in the aggregating step is preferably not lower than the temperature which is lower by 60° C. than a softening point of the resin binder (softening point of the resin binder−(minus) 60° C.) but not higher than the softening point.

Meanwhile, upon aggregating the primary particles, only the primary particles obtained in the step (1) may be aggregated (homo-aggregation), or the primary particles may be aggregated together with other fine resin particles by mixing a dispersion of the primary particles with a dispersion of the other fine resin particles obtained in the same manner as in the step (1) or the like (hetero-aggregation).

In addition, the additives such as colorants and charge controlling agents may be previously mixed in the resin binder upon preparing the primary particles. Alternatively, the respective additives may be separately dispersed in a dispersing medium such as water to prepare dispersions, and the thus prepared dispersions may be mixed with the primary particles and subjected to the aggregating step. When the additives are previously mixed in the resin binder upon preparing the primary particles, the resin binder and the additives are preferably previously melt-kneaded with each other. The melt-kneading is preferably carried out using an open roll type twin-screw kneader. The open roll type twin-screw kneader has two rolls arranged dose to and parallel with each other through each of which a beating medium can be passed to impart a heating function or a cooling function thereto. Thus, since the open roll type twin-screw kneader has a melt-kneading section having an open structure and is equipped with a heating roll and a cooling roll, a kneading heat generated upon the melt-kneading can be readily released therefrom unlike the conventional twin-screw kneaders.

In the aggregating step, in order to effectively carry out the aggregation, an aggregating agent may be added. As the organic aggregating agent, a cationic surfactant in the form of a quaternary salt, polyethyleneimine, or the like may be used, and as the inorganic aggregating agent, an inorganic metal salt, a divalent or higher polyvalent metal complex or the like may be used. The inorganic metal salt includes, for example, metal salts such as sodium sulfate, sodium chloride, calcium chloride, calcium nitrate, barium chloride, magnesium chloride, zinc chloride, aluminum chloride and aluminum sulfate; and inorganic metal salt polymers such as poly(aluminum chloride), poly(aluminum hydroxide), and poly(calcium sulfide).

The amount of the aggregating agent used is preferably 30 parts by weight or less, more preferably 20 parts by weight or less and even more preferably 10 parts by weight or less on the basis of 100 parts by weight of the resin binder, in view of a good environmental resistance of the resultant toner.

The aggregating agent is preferably added in the form of an aqueous solution, and the resultant mixture is preferably sufficiently stirred during and after addition of the aggregating agent.

Next, the aggregated particles thus obtained in the above aggregating step which contain at least the resin binder are heated and unified (unifying step).

The temperature of the reaction system in the unifying step is preferably not lower than the temperature which is lower by 30° C. than the softening point of the resin binder (softening point of the resin binder−(minus) 30° C.) but not higher than the temperature which is higher by 10° C. than the softening point of the resin binder (softening point of the resin binder+(plus) 10° C.), more preferably not lower than the temperature which is lower by 25° C. than the softening point of the resin binder (softening point of the resin binder−(minus) 25° C.) but not higher than the temperature which is higher by 10° C. than the softening point of the resin binder (softening point of the resin binder+(plus) 10° C.), and even more preferably not lower than the temperature which is lower by 20° C. than the softening point of the resin binder (softening point of the resin binder−(minus) 20° C.) but not higher than the temperature which is higher by 10° C. than the softening point of the resin binder (softening point of the resin binder+(plus) 10° C.) in view of controlling a particle size, a particle size distribution and a shape of the toner as aimed as well as fusibility of the aggregate particles. In addition, the stirring rate is preferably such a rate at which the aggregated particles are not precipitated.

The unified particles obtained in the step (2) may be appropriately subjected to subsequent steps such as liquid-solid separation such as filtration, washing and drying according to requirements, thereby obtaining a toner.

In the washing step, an acid is preferably used to remove metal ions on the surface of the respective toner particles for the purpose of ensuring sufficient chargeability and reliability as a toner. Also, in the washing step, the nonionic surfactant previously added is preferably completely removed from the toner. For this purpose, the washing step is preferably carried out in an aqueous solution at a temperature not higher than the cloud point of the nonionic surfactant. The washing step is preferably carried out plural times.

In addition, the drying step may be carried out by any optional methods such as vibration-type fluidizing/drying method, spray-drying method, freeze-drying method or flash jet method. The water content in the toner after being dried is adjusted to preferably 1.5% by weight or less and more preferably 1.0% by weight or less in view of a good chargeability of the toner.

The volume-median particle size ($D_{50}$) of the toner is preferably from 1 to 10 μm, more preferably from 2 to 8 μm and even more preferably from 3 to 7 μm in view of high image quality and high productivity.

Also, the toner preferably has a softening point of from 80 to 160° C., more preferably from 80 to 150° C. and even more preferably from 90 to 140° C. in view of low-temperature fixing property. In addition, the toner preferably has a glass transition point of from 45 to 80° C. and more preferably from 50 to 70° C. from the same viewpoint.

In the toner obtained by the present invention, an external additive such as a fluidizing agent may be applied to the surface of the toner particles. As the external additive, there may be used known fine particles, e.g., inorganic fine particles such as fine silica particles whose surface is hydrophobilized, fine titanium oxide particles, fine alumina particles, fine cerium oxide particles and carbon blacks as well as fine particles of polymers such as polycarbonates, poly(methyl methacrylate) and silicon resins.

The number-average particle size of the external additive is preferably from 4 to 200 nm and more preferably from 8 to 30 nm. The number-average particle size of the external additive may be measured using a scanning type electron microscope or a transmission type electron microscope.

The amount of the external additive formulated is preferably from 0.8 to 5.0 parts by weight, more preferably from 1.0 to 5.0 parts by weight and even more preferably from 1.5 to 3.5 parts by weight on the basis of 100 parts by weight of the toner before being treated with the external additive. When a hydrophobic silica is used as the external additive, the hydrophobic silica is preferably added in an amount of from 0.8 to 3.5 parts by weight and preferably from 1.0 to 3.0 parts by weight on the basis of 100 parts by weight of the toner before being treated with the external additive, in order to attain desired effects.

Since the polyester of the present invention exhibits an excellent hydrolysis resistance, the resin binder containing a given amount of the polyester is also excellent in hydrolysis resistance. The toner for electrophotography according to the present invention which contains the polyester of the present invention is excellent in both a storage stability and a fixing property.

The toner for electrophotography according to the present invention can be used as not only an one-component type developer but also a two-component type developer in the form of a mixture with a carrier.

The polyester for a toner for electrophotography according to the present invention can be suitably used as a resin binder for the toner for electrophotography which is employed for developing latent images formed by electrophotography, electrostatic recording method, electrostatic printing method or the like.

The present invention is described in more detail by referring to the following examples. However, it should be noted that these examples are only illustrative and not intended to limit the invention thereto.

Various properties were measured and evaluated by the following methods.

1. Acid Value of Resins

Determined according to JIS K0070. However, with respect to only a solvent used upon the measurement, the mixed solvent of ethanol and ether as prescribed in JIS K0070 was replaced with a mixed solvent containing acetone and toluene at a volume ratio of 1:1.

2. Softening Point and Glass Transition Point of Resins (1) Softening Point

The softening point refers to a temperature at which a half the amount of a sample flows out when plotting a downward movement of a plunger against temperature, as measured by using a flow tester "CFT-500D" available from Shimadzu Seisakusho Co., Ltd., in which 1 g of the sample was extruded through a nozzle having a die pore size of 1 mm and a length of 1 mm while heating the sample so as to raise the temperature at a rate of 6° C./min and applying a load of 1.96 MPa thereto with the plunger.

(2) Endothermic Maximum Peak Temperature, Melting Point and Glass Transition Point Using a differential scanning calorimeter "DSC 210" available from Seiko Instruments, Inc., 0.01 to 0.02 g of a sample weighed on an aluminum pan was heated to 200° C., cooled from 200° C. to 0° C. at a temperature drop rate of 10° C./min and further heated at a temperature rise rate of 10° C./min to prepare an endothermic curve. The temperature of the peak present on the highest temperature side among the endothermic peaks observed in the curve was determined as the endothermic maximum peak temperature. If the difference between the maximum peak temperature and the softening point lies within 20° C., the maximum peak temperature is determined as the melting point.

When the difference between the maximum peak temperature and the softening point exceeds 20° C., the glass transition point of the sample was read out as the temperature at which an extension of a base line below the endothermic maximum peak temperature intersects a tangential line having a maximum inclination in a region from a raise-up portion to an apex of the peak.

3. Particle Size of Dispersed Primary Particles (1) Measuring Apparatus:

Laser diffraction particle size analyzer "LA-920" available from Horiba Seisakusho Co., Ltd.;

(2) Measuring Conditions:

A measuring cell was charged with distilled water, and a volume-median particle size ($D_{50}$) was measured at a concentration of the dispersion at which an absorbance thereof was within a proper range.

4. Particle Size of Toner (1) Preparation of Dispersion

Ten milligrams of a sample to be measured was added to 5 mL of a dispersing medium (a 5% by weight aqueous solution of "EMULGEN 109P" (available from Kao Corp.; polyoxyethylene lauryl ether, HLB: 13.6), and dispersed using an ultrasonic disperser for 1 min. Thereafter, 25 mL of electrolytic solution "Isotone II" available from Beckman Coulter, Inc., was added to the obtained mixture, and the mixture was further dispersed using the ultrasonic disperser for 1 min to obtain a dispersion.

(2) Measuring Apparatus: Coulter Multisizer II (Available from Beckman Coulter Inc.)

Aperture Diameter: 50 μm; Analyzing Software: Coulter Multisizer AccuComp Ver. 1.19 (available from Beckman Coulter Inc.)

(3) Measuring Conditions

One-hundred milliliters of an electrolyte and the dispersion were charged into a beaker, and particle sizes of 30000 particles in the dispersion were measured at such a concentration of the dispersion at which the measurement for the 30000 particles were completed for 20 s, to determine a volume-median particle size ($D_{50}$) thereof.

5. Melting Point of Wax

Using a differential scanning calorimeter "DSC 210" available from Seiko Instruments, Inc., a sample was heated to 200° C., cooled from 200° C. to 0° C. at a temperature drop rate of 10° C./min and further heated at a temperature rise rate of 10° C./min to measure a heat of melting of the sample. The melting point was determined as a maximum peak temperature of the heat of melting.

6. Gas Chromatography/Mass Spectrometry

A gas chromatograph/mass spectrometer (GC/MS) was fitted with a CI ion source and the following analyzing column to bring the GC/MS into a ready-to-use condition. Meanwhile, while flowing a CI reaction gas (methane) through the column, the MS section was subjected to a vacuum evacuation work, and after the elapse of 24 h from the vacuum evacuation, the analyzer was tuned.

(1) GC

Gas chromatograph: "HP6890N" available from Agilent Inc.

Analyzing column: "Ultra 1" available from HP Corp.; column length: 50 m; inner diameter: 0.2 mm; membrane thickness: 0.33 μm Heating conditions for GC oven: Initial temperature: 100° C. (0 min); first stage temperature rise rate: 1° C./m (up to 150° C.); second stage temperature rise rate: 10° C./in (up to 300° C.); final temperature: 300° C. (10

Amount of sample filled: 1 μL

Conditions at filling inlet: Filling mode; Split method; Split ratio: 50:1; Filling inlet temperature: 300° C.

Carrier gas: Kind of gas: Helium; Flow rate: 1 mL/min (constant flow rate mode)

(2) Detector

Mass spectrometer: "5973N MSD" available from Agilent Inc.

Ionization method: Chemical ionization method

Reaction gas: Isobutane

Temperature setting: Quadrupole: 150° C.; Ion source: 250° C.

Detecting conditions: Scanning

Scanning range: m/z 75 to 300

ON time of detector: 5 min

Calibration (mass calibration and sensitivity control): Reaction gas: Methane; Calibrant: PFDTD (perfluoro-5,8-dimethyl-3,6,9-trioxydodecane)

Tuning method: Auto-tuning (3) Preparation of Sample

A propylene tetramer was dissolved in isopropyl alcohol to prepare a 5% solution thereof.

(Data Processing)

Alkene components having 9 to 14 carbon atoms (C9 to C14) were subjected to extraction of mass chromatograms based on mass numbers corresponding to molecular ions of the respective components, and integration of the thus obtained mass chromatograms was executed at S/N (signal/noise ratio)>3 under the integration conditions for the respective components. From the detection results shown in Tables 1 to 5 below, the ratio of the specific alkyl chain length components was calculated according to the following formula:

Ratio of specific alkyl chain length components=[(sum of integral values of specific alkyl chain length components)/(sum of integral values of whole C9 to C14 components)]×100(%)

TABLE 1

| | Molecular weight (MW) | Molecular ion (M/Z) | Monitor mass range (MZ to M/Z) |
|---|---|---|---|
| C9H18 | 126 | 127 | 126.70 to 127.70 |
| C10H20 | 140 | 141 | 140.70 to 141.70 |
| C11H22 | 154 | 155 | 154.70 to 155.70 |
| C12H24 | 168 | 169 | 168.70 to 169.70 |
| C13H26 | 182 | 183 | 182.70 to 183.70 |
| C14H28 | 196 | 197 | 196.70 to 197.70 |

(4) Integration Conditions $C_9H_{18}$

TABLE 2

| Integration conditions | Integral value (V) | Time (T) |
|---|---|---|
| Initial area reject | 0 | Initial stage |
| Initial peak width | 0.200 | Initial stage |
| Shoulder detection | OFF | Initial stage |
| Initial threshold | 5.0 | Initial stage |
| Peak width | 2.000 | 5.000 |

$C_{10}H_{20}$

TABLE 3

| Integration conditions | Integral value (V) | Time (T) |
|---|---|---|
| Initial area reject | 0 | Initial stage |
| Initial peak width | 0.200 | Initial stage |
| Shoulder detection | OFF | Initial stage |
| Initial threshold | 7.0 | Initial stage |
| Peak width | 2.000 | 5.000 |

$C_{11}H_{22}$, $C_{12}H_{24}$ and $C_{13}H_{26}$

TABLE 4

| Integration conditions | Integral value (V) | Time (T) |
|---|---|---|
| Initial area reject | 0 | Initial stage |
| Initial peak width | 0.200 | Initial stage |
| Shoulder detection | OFF | Initial stage |
| Initial threshold | 7.0 | Initial stage |
| Peak width | 2.000 | 5.000 |

$C_{14}H_{28}$

TABLE 5

| Integration conditions | Integral value (V) | Time (T) |
|---|---|---|
| Initial area reject | 0 | Initial stage |
| Initial peak width | 0.200 | Initial stage |
| Shoulder detection | OFF | Initial stage |
| Initial threshold | 5.0 | Initial stage |
| Peak width | 2.000 | 11.000 |

In the present invention, alkylene compounds corresponding to those having 9 to 14 carbon atoms mean peaks corresponding to the respective molecular ions as measured by gas chromatography/mass spectrometry.

Production of Alkylene Compound A

A propylene tetramer "LIGHT TETRAMER" available from Shin-Nihon Sekiyu Co., Ltd., was subjected to fractional distillation under heating at a temperature of 183 to 208° C., thereby obtaining an alkylene compound A. As a result of analyzing the thus obtained alkylene compound A by gas chromatography/mass spectrometry, it was confirmed that the alkylene compound A had 40 peaks.

Production of Alkylene Compound B

The same procedure as described above in "Production of Alkylene Compound A" was repeated except that the fractional distillation was conducted at a temperature of 171 to 175° C., thereby obtaining an alkylene compound B. As a result of analyzing the thus obtained alkylene compound B by gas chromatography/mass spectrometry, it was confirmed that the alkylene compound B had 25 peaks.

Production of Alkenyl Succinic Anhydride A

A 1 L autoclave available from Nitto Koatsu Co., Ltd., was charged with 542.4 g of the alkylene compound A, 157.2 g of maleic anhydride, 0.4 g of "CHELEX-O" available from Sakai Kagaku Kogyo Co., Ltd., and 0.1 g of butyl hydroquinone (hereinafter referred to merely as "BHQ"), and then purged with nitrogen under a pressure of 0.2 MPaG 3 times. After initiating agitation at 60° C., the contents of the autoclave were heated to 230° C. over 1 h, and reacted with each other for 6 h. The pressure upon reaching the reaction temperature was 0.3 MPaG. After completion of the reaction, the reaction mixture was cooled to 80° C., and after the pressure was returned to normal pressure (101.3 kPa), the reaction mixture was transferred to a 1 L four-necked flask. The reaction mixture was heated to 180° C. while stirring, and the residual alkylene compound was distilled off therefrom for 1 h under a pressure of 1.3 kPa Successively, the obtained reaction solution was cooled to room temperature (25° C.), and the pressure was returned to normal pressure (101.3 kPa), thereby obtaining 406.1 g of the aimed alkenyl succinic anhydride A.

Production of Alkenyl Succinic Anhydride B

The same procedure as described above in "Production of Alkenyl Succinic Anhydride A" was repeated except for using the alkylene compound B in place of the alkylene compound A, thereby obtaining an alkenyl succinic anhydride B.

Production of Dodecenyl Succinic Anhydride

The same procedure as described above in "Production of Alkenyl Succinic Anhydride A" was repeated except for using commercially available 1-dodecene exhibiting one peak in gas chromatography/mass spectrometry in place of the alkylene compound A, thereby obtaining dodecenyl succinic anhydride.

Example 1

The raw monomers of polyester except for trimellitic anhydride, and the esterification catalyst as shown in Table 6 were charged into a 5 L four-necked flask equipped with a thermometer, a stainless steel stirring bar, a falling type condenser and a nitrogen feed pipe, and the raw monomers were reacted with each other in a mantle heater in a nitrogen atmosphere at 230° C. under normal pressure (101.3 kPa) for 7 h and then under a pressure of 8 kPa for 1 h. The obtained reaction solution was cooled to 210° C., and mixed and reacted with trimellitic anhydride as shown in Table 6. The degree of polymerization of the reaction product was traced by monitoring a softening point thereof according to "Ring-and-Ball Softening Point Testing Method" of the JIS Standard (using a ring-and-ball automatic softening point tester "25D5-ASP-MG Model" available from Meitec Co., Ltd.; heating medium for measurement: glycerol; temperature rise rate: 5° C./min; thermometer: JIS B7410 SP34 (for higher softening point) and SP33 (for lower softening point)). When the softening point reached a predetermined temperature, the reaction was terminated, thereby obtaining a polyester resin A.

Example 2

The same procedure as in Example 1 was repeated except for using the raw monomers of polyester and the esterification catalyst as shown in Table 6, thereby obtaining a polyester resin B.

Example 3

The same procedure as in Example 1 was repeated except for using the raw monomers of polyester and the esterification catalyst as shown in Table 6 and changing the time of the reaction conducted at 230° C. under normal pressure (101.3 kPa) to 6 h, thereby obtaining a polyester resin C.

Example 4

The raw monomers of polyester except for alkenyl succinic acid, and the esterification catalyst as shown in Table 6 were charged into a 5 L four-necked flask equipped with a thermometer, a stainless steel stirring bar, a falling type condenser and a nitrogen feed pipe, and the raw monomers were reacted with each other in a mantle heater in a nitrogen atmosphere at 230° C. under normal pressure (101.3 kPa) for 6 h and then under a pressure of 8 kPa for 1 h. The obtained reaction solution was cooled to 220° C., and mixed and reacted with the alkenyl succinic anhydride A. The degree of polymerization of the reaction product was traced by monitoring a softening point thereof in the same manner as in Example 1. When the softening point reached a predetermined temperature, the reaction was terminated, thereby obtaining a polyester resin D.

Example 5

The same procedure as in Example 1 was repeated except for using the raw monomers of polyester and the esterification catalyst as shown in Table 6 and changing the time of the reaction conducted at 230° C. under normal pressure (101.3 kPa) to 8 h, thereby obtaining a polyester resin E.

Example 6

The same procedure as in Example 1 was repeated except for using the raw monomers of polyester and the esterification catalyst as shown in Table 6 and changing the time of the reaction conducted at 230° C. under normal pressure (101.3 kPa) to 8 h, thereby obtaining a polyester resin F.

Example 7

The same procedure as in Example 1 was repeated except for using the raw monomers of polyester and the esterification catalyst as shown in Table 6 and changing the time of the reaction conducted at 230° C. under normal pressure (101.3 kPa) to 6 h, thereby obtaining a polyester resin G.

Examples 8, 10 and 11

The raw monomers of polyester except for trimellitic anhydride, and the esterification catalyst as shown in Table 6 were charged into a 5 L four-necked flask equipped with a thermometer, a stainless steel stirring bar, a falling type condenser and a nitrogen feed pipe, and the raw monomers were reacted with each other in a mantle heater in a nitrogen atmosphere at 235° C. under normal pressure (101.3 kPa) for 12 h and then further reacted under a pressure of 8 kPa for 1 h. The obtained reaction solution was cooled to 210° C., and mixed and reacted with trimellitic anhydride as shown in Table 6. The degree of polymerization of the reaction product was traced by monitoring a softening point thereof according to "Ring-and-Ball Softening Point Testing Method" of the JIS Standard (using a ring-and-ball automatic softening point tester "25D5-ASP-MG Model" available from Meitec Co., Ltd.; heating medium for measurement: glycerol; temperature rise rate: 5° C./min; thermometer: JIS B7410 SP34 (for higher softening point) and SP33 (for lower softening point)). When the softening point reached a predetermined temperature, the reaction was terminated, thereby obtaining respective polyester resins H, J and K.

Example 9

The raw monomers of polyester except for fumaric acid, and the esterification catalyst as shown in Table 6 were charged into a 5 L four-necked flask equipped with a thermometer, a stainless steel stirring bar, a failing type condenser and a nitrogen feed pipe, and the raw monomers were reacted with each other in a mantle heater in a nitrogen atmosphere at 235° C. under normal pressure (101.3 kPa) for 12 h and then further reacted under a pressure of 8 kPa for 1 h. The obtained reaction solution was cooled to 185° C., and mixed with fumaric acid and hydroquinone as shown in Table 6. The reaction solution was heated from 185° C. to 210° C. over 4 h and reacted at 210° C. The degree of polymerization of the reaction product was traced by monitoring a softening point thereof according to "Ring-and-Ball Softening Point Testing Method" of the JIS Standard (using a ring-and-ball automatic softening point tester "25D5-ASP-MG Model" available from Meitec Co., Ltd.; heating medium for measurement: glycerol; temperature rise rate: 5° C./min; thermometer: JIS B7410 SP34 (for higher softening point) and SP33 (for lower softening point)). When the softening point reached a predetermined temperature, the reaction was terminated, thereby obtaining a polyester resin I.

Comparative Example 1

The raw monomers of polyester except for trimellitic anhydride, and the esterification catalyst as shown in Table 6 were charged into a 5 L four-necked flask equipped with a thermometer, a stainless steel stirring bar, a falling type condenser and a nitrogen feed pipe, and the raw monomers were reacted with each other in a mantle heater in a nitrogen atmosphere at 210° C. under normal pressure (101.3 kPa) for 8 h and then under a pressure of 8 kPa for 1 h. Thereafter, the obtained reaction solution was mixed and reacted with trimellitic anhydride and hydroquinone as shown in Table 6. The degree of polymerization of the reaction product was traced by monitoring a softening point thereof in the same manner as in Example 1. When the softening point reached a predetermined temperature, the reaction was terminated, thereby obtaining a polyester resin L.

Comparative Example 2

The raw monomers of polyester except for fumaric add and trimellitic anhydride, and the esterification catalyst as shown in Table 6 were charged into a 5 L four-necked flask equipped with a thermometer, a stainless steel stirring bar, a falling type condenser and a nitrogen feed pipe, and the raw monomers were reacted with each other in a mantle heater in a nitrogen atmosphere at 235° C. under normal pressure (101.3 kPa) for 12 h and then further reacted under a pressure of 8 kPa for 1 h. The obtained reaction solution was cooled to 185° C., and mixed with fumaric acid, trimellitic anhydride and hydroquinone as shown in Table 6. The reaction solution was heated from 185° C. to 210° C. over 4 h and reacted at 210° C. The degree of polymerization of the reaction product was traced by monitoring a softening point thereof according to "Ring-and-Ball Softening Point Testing Method" of the JIS Standard (using a ring-and-ball automatic softening point tester "25D5-ASP-MG Model" available from Meitec Co., Ltd.; heating medium for measurement: glycerol; temperature rise rate: 5° C./min; thermometer: JIS B7410 SP34 (for higher softening point) and SP33 (for lower softening point)). When the softening point reached a predetermined temperature, the reaction was terminated, thereby obtaining a polyester resin M.

TABLE 6

| | Examples | | | | | | | |
|---|---|---|---|---|---|---|---|---|
| | 1 Resin A | | 2 Resin B | | 3 Resin C | | 4 Resin D | |
| | (g) | mol | (g) | mol | (g) | mol | (g) | mol |
| Raw monomers for polyester Alcohol component | | | | | | | | |
| BPA-PO[1)] | 1296 | 3.7 | 1885 | 5.4 | 1750 | 5.0 | — | — |
| BPA-EO[2)] | 1203 | 3.7 | 750 | 2.3 | 696 | 2.1 | 2500 | 7.7 |
| Carboxylic acid component | | | | | | | | |
| Terephthalic acid | 848 | 5.1 | 741 | 4.5 | 534 | 3.2 | 1022 | 6.2 |
| Trimellitic anhydride | 85 | 0.44 | 207 | 1.1 | 343 | 1.8 | — | — |
| Fumaric acid | — | — | — | — | — | — | — | — |
| Alkenyl succinic anhydride A | 496 | 1.9 | 247 | 0.92 | 574 | 2.1 | 412 | 1.5 |
| Alkenyl succinic anhydride B | — | — | — | — | — | — | — | — |
| Dodecenyl succinic anhydride | — | — | — | — | — | — | — | — |
| Esterification catalyst | | | | | | | | |
| Titanium catalyst[3)] | 19.7 | — | — | — | — | — | — | — |
| Tin octylate | — | — | — | — | — | — | — | — |
| Dibutyl tin oxide | — | — | 7.7 | — | 7.8 | — | 7.9 | — |
| Softening point (° C.) | 123.3 | | 135.5 | | 140.0 | | 105.9 | |
| Glass transition point (° C.) | 60.2 | | 66.0 | | 60.3 | | 59.4 | |
| Endothermic peak temperature | 65.3 | | 69.3 | | 64.2 | | 65.7 | |
| Softening point/endothermic peak temperature | 1.9 | | 2.0 | | 2.2 | | 1.6 | |
| Acid value (mg KOH/g) | 17.0 | | 3.1 | | 23.0 | | 9.2 | |

TABLE 6-continued

| | Examples | | | | | |
|---|---|---|---|---|---|---|
| | 5 Resin E | | 6 Resin F | | 7 Resin G | |
| | (g) | mol | (g) | mol | (g) | mol |
| Raw monomers for polyester Alcohol component | | | | | | |
| BPA-PO[1)] | 1867 | 5.3 | 2036 | 5.8 | 1815 | 5.2 |
| BPA-EO[2)] | 743 | 2.3 | 473 | 1.5 | 722 | 2.2 |
| Carboxylic acid component | | | | | | |
| Terephthalic acid | 873 | 5.3 | 845 | 5.1 | 553 | 3.3 |
| Trimellitic anhydride | 219 | 1.1 | 195 | 1.0 | 356 | 1.9 |
| Fumaric acid | — | — | — | — | — | — |
| Alkenyl succinic anhydride A | 123 | 0.46 | — | — | — | — |
| Alkenyl succinic anhydride B | — | — | 390 | 1.5 | — | — |
| Dodecenyl succinic anhydride | — | — | — | — | 4.96 | 1.9 |
| Esterification catalyst | | | | | | |
| Titanium catalyst[3)] | — | — | — | — | — | — |
| Tin octylate | — | — | — | — | — | — |
| Dibutyl tin oxide | 7.7 | — | 7.8 | — | 7.9 | — |
| Softening point (° C.) | 106.1 | | 129.4 | | 105.1 | |
| Glass transition point (° C.) | 63.5 | | 63.1 | | 61.0 | |
| Endothermic peak temperature | 69.4 | | 68.9 | | 67.3 | |
| Softening point/endothermic peak temperature | 1.5 | | 1.9 | | 1.6 | |
| Acid value (mg KOH/g) | 24.2 | | 19.0 | | 25.0 | |

| | Examples | | | | | | | |
|---|---|---|---|---|---|---|---|---|
| | 8 Resin H | | 9 Resin I | | 10 Resin J | | 11 Resin K | |
| | (g) | mol | (g) | mol | (g) | mol | (g) | mol |
| Raw monomers for polyester Alcohol component | | | | | | | | |
| BPA-PO[1)] | 1960 | 5.6 | 1225 | 3.5 | 1715 | 4.9 | 1960 | 5.6 |
| BPA-EO[2)] | 455 | 1.4 | 1137.5 | 3.5 | 682.5 | 2.1 | 455 | 1.4 |
| Carboxylic acid component | | | | | | | | |
| Terephthalic acid | 639.1 | 3.85 | 639.1 | 3.85 | 697.2 | 4.2 | 639.1 | 3.85 |
| Trimellitic anhydride | 134.4 | 0.7 | — | — | 201.6 | 1.05 | 134.4 | 0.7 |
| Fumaric acid | — | — | 203 | 1.75 | — | — | — | — |
| Alkenyl succinic anhydride A | 656.6 | 2.45 | 375.2 | 1.4 | 562.8 | 2.1 | — | — |
| Alkenyl succinic anhydride B | — | — | — | — | — | — | 656.6 | 2.45 |
| Dodecenyl succinic anhydride | — | — | — | — | — | — | — | — |
| Esterification catalyst | | | | | | | | |
| Titanium catalyst[3)] | — | — | — | — | — | — | — | — |
| Tin octylate | 20 | — | 20 | — | 20 | — | 20 | — |
| Dibutyl tin oxide | — | — | — | — | — | — | — | — |
| Polymerization inhibitor | | | | | | | | |
| Hydroquinone | — | — | 2.0 | — | — | — | — | — |
| Softening point (° C.) | 117.6 | | 110.2 | | 135.1 | | 115.6 | |
| Glass transition point (° C.) | 59.3 | | 60.7 | | 62.4 | | 60.3 | |
| Endothermic peak temperature | 63.2 | | 64.1 | | 66.6 | | 65.5 | |
| Softening point/endothermic peak temperature | 1.9 | | 1.7 | | 2.0 | | 1.8 | |

TABLE 6-continued

| | | | | |
|---|---|---|---|---|
| Acid value (mg KOH/g) | 16.9 | 10.2 | 25.6 | 18.4 |

| | Comparative Examples | | | |
|---|---|---|---|---|
| | 1 Resin L | | 2 Resin M | |
| | (g) | mol | (g) | mol |
| Raw monomers for polyester Alcohol component | | | | |
| BPA-PO[1)] | 2520 | 7.2 | 1715 | 4.9 |
| BPA-EO[2)] | 260 | 0.8 | 682.5 | 2.1 |
| Carboxylic acid component | | | | |
| Terephthalic acid | — | — | 639.1 | 3.85 |
| Trimellitic anhydride | 538 | 2.8 | 201.6 | 1.05 |
| Fumaric acid | — | — | — | — |
| Alkenyl succinic anhydride A | 603 | 5.2 | 203 | 1.75 |
| Alkenyl succinic anhydride B | — | — | — | — |
| Dodecenyl succinic anhydride | — | — | — | — |
| Esterification catalyst | | | | |
| Titanium catalyst[3)] | — | — | — | — |
| Tin octylate | — | — | — | — |
| Dibutyl tin oxide | 7.9 | — | 7.9 | — |
| Polymerization inhibitor | | | | |
| Hydroquinone | 2.0 | — | 2.0 | — |
| Softening point (° C.) | 147.0 | | 119.8 | |
| Glass transition point (° C.) | 64.8 | | 65.9 | |
| Endothermic peak temperature | 70.2 | | 70.3 | |
| Softening point/endothermic peak temperature | 2.1 | | 1.7 | |
| Acid value (mg KOH/g) | 23.3 | | 30.1 | |

Note:
[1)]Polyoxypropylene (2,2)-2,2-bis(4-hydroxyphenyl)propane
[2)]Polyoxyethylene (2,2)-2,2-bis(4-hydroxyphenyl)propane
[3)]Titanium diisopropylate bis(triethanol aminate)

Production Examples 1 to 4

The monomers and the catalyst as shown in Table 7 were charged into a 5 L four-necked flask equipped with a nitrogen feed pipe, a dehydration pipe, a stirrer and a thermocouple, and the monomers were reacted with each other in a nitrogen atmosphere at 135° C. until reaching a reaction rate of 50%. Thereafter, the reaction solution was stepwise heated to 200° C. over 5 h. Then, after confirming that the reaction rate reached 90% or more, the reaction solution was reacted under a pressure of 8 kPa until reaching a desired softening point, thereby obtaining respective crystalline polyester resins C-1 to C-4.

TABLE 7

| | Production Examples | | | | | | | |
|---|---|---|---|---|---|---|---|---|
| | 1 Resin C-1 | | 2 Resin C-2 | | 3 Resin C-3 | | 4 Resin C-4 | |
| | (g) | mol | (g) | mol | (g) | mol | (g) | mol |
| Raw monomers for polyester Alcohol component | | | | | | | | |
| 1,4-Butanediol | — | — | 1071 | 11.9 | — | — | — | — |
| 1,6-Hexanediol | 1888 | 16 | 601.8 | 5.1 | — | — | 236 | 2 |
| 1,9-Nonanediol | — | — | — | — | 1920 | 12.0 | 1280 | 8 |
| Carboxylic acid component | | | | | | | | |
| Fumaric acid | 1229 | 11.2 | 1479 | 12.75 | — | — | — | — |
| Adipic acid | 700.8 | 4.8 | 620.5 | 4.25 | 876 | 6 | — | — |

TABLE 7-continued

| | Production Examples | | | | | | | |
|---|---|---|---|---|---|---|---|---|
| | 1 Resin C-1 | | 2 Resin C-2 | | 3 Resin C-3 | | 4 Resin C-4 | |
| | (g) | mol | (g) | mol | (g) | mol | (g) | mol |
| Sebacic acid | — | — | — | — | 1212 | 6 | — | — |
| 1,10-Decanedicarboxylic acid | — | — | — | — | — | — | 2300 | 10 |
| Esterification catalyst | | | | | | | | |
| Tin octylate | — | — | — | — | — | — | — | — |
| Dibutyl tin oxide | — | — | 7.7 | — | 7.8 | — | 7.9 | — |
| Polymerization inhibitor | | | | | | | | |
| Hydroquinone | 2.0 | — | — | — | — | — | — | — |
| Softening point (° C.) | 92.1 | | 95.6 | | 80.1 | | 81.2 | |
| Glass transition point (° C.) | Not detected | | Not detected | | Not detected | | Not detected | |
| Endothermic peak temperature | 94.3 | | 98.4 | | 78.1 | | 82.3 | |
| Softening point/endothermic peak temperature | 1.0 | | 1.0 | | 1.0 | | 1.0 | |
| Acid value (mg KOH/g) | Not measurable | | Not measurable | | Not measurable | | Not measurable | |

Next, the polyester resins A to H and L obtained in Examples 1 to 8 and Comparative Example 1, respectively, were subjected to a hydrolysis resistance test for evaluating a hydrolysis resistance thereof. In addition, the resins obtained by mixing any of the polyester resins A, H to K and M with any of the crystalline polyesters C-1 to C-4 were also subjected to the same hydrolysis resistance test as conducted above, and these tests are shown as Reference Examples 1 to 14 in Table 8. The results are shown in Table 8 together with the number of peaks of alkenyl succinic acid as measured by gas chromatography/mass spectrometry.

(Hydrolysis Resistance Test for Resins)

A 100 mL round-bottom flask was charged with 1.0 g of a resin to be evaluated, and 20 mL of a methanol solution containing 0.1 mol/L of potassium hydroxide and then 20 mL of distilled water were further added to the flask. The contents of the flask were heated in a hot water bath at 90° C. for 5 h. After completion of heating for 5 h, the contents of the flask were neutralized with 0.1 mol/L hydrochloric acid, and after the solvent was removed therefrom, the residual resin was dried. The glass transition point of the thus obtained resin was measured and compared with that of the resin before the test. The results were evaluated according to the following evaluation criteria to determine a hydrolysis resistance of the resin.

A: Difference in glass transition point between before and after the test was less than 1° C.;

B: Difference in glass transition point between before and after the test was not less than 1° C. but less than 3° C.;

C: Difference in glass transition point between before and after the test was not less than 3° C. but less than 6° C.; and D: Difference in glass transition point between before and after the test was not less than 6° C.

As a result, it was confirmed that all of the polyester resins using the alkenyl succinic anhydride (Examples 1 to 8) had a good hydrolysis resistance. It was also confirmed that the resins obtained in all of Reference Examples 1 to 12 which contained the polyester resins according to the present invention exhibited a good hydrolysis resistance.

TABLE 8

| | Amorphous resin | | Resin binder | | Alkenyl succinic acid | |
|---|---|---|---|---|---|---|
| | Kind | wt % | Kind | wt % | Content[1)] | Number of peaks in GC/MS |
| Example 1 | Resin A | 100 | — | 0 | 25 | 40 |
| Example 2 | Resin B | 100 | — | 0 | 14 | 40 |
| Example 3 | Resin C | 100 | — | 0 | 30 | 40 |
| Example 4 | Resin D | 100 | — | 0 | 20 | 40 |
| Example 5 | Resin E | 100 | — | 0 | 6 | 40 |
| Example 6 | Resin F | 100 | — | 0 | 19 | 25 |
| Example 7 | Resin G | 100 | — | 0 | 25 | 1 |
| Example 8 | Resin H | 100 | — | — | 35 | 40 |
| Comparative Example 1 | Resin L | 100 | — | 0 | 0 | 0 |

| | Hydrolysis resistance test | | | |
|---|---|---|---|---|
| | Tg (° C.) before test | Tg (° C.) after test | Difference in Tg (° C.) | Rating |
| Example 1 | 60.2 | 60.2 | 0.0 | A |
| Example 2 | 66.0 | 63.2 | −2.8 | B |
| Example 3 | 60.3 | 61.1 | 0.8 | A |
| Example 4 | 59.4 | 58.6 | −0.8 | A |
| Example 5 | 63.5 | 61.5 | −2.0 | B |
| Example 6 | 63.1 | 60.4 | −2.7 | B |
| Example 7 | 61.0 | 56.8 | −4.2 | C |
| Example 8 | 59.6 | 59.5 | 0.1 | A |
| Comparative Example 1 | 64.8 | 55.5 | −9.3 | D |

| | Amorphous resin | | Resin binder | | Alkenyl succinic acid | |
|---|---|---|---|---|---|---|
| | Kind | wt % | Kind | wt % | Content[1)] | Number of peaks in GC/MS |
| Reference Example 1 | Resin A | 95 | C-1 | 5 | 25 | 40 |

TABLE 8-continued

| | | | | | | |
|---|---|---|---|---|---|---|
| Reference Example 2 | Resin H | 95 | C-1 | 5 | 35 | 40 |
| Reference Example 3 | Resin H | 95 | C-1 | 5 | 35 | 40 |
| Reference Example 4 | Resin H | 95 | C-2 | 5 | 35 | 40 |
| Reference Example 5 | Resin H | 95 | C-3 | 5 | 35 | 40 |
| Reference Example 6 | Resin H | 95 | C-4 | 5 | 35 | 40 |
| Reference Example 7 | Resin I | 95 | C-1 | 5 | 20 | 40 |
| Reference Example 8 | Resin J | 95 | C-1 | 5 | 28.5 | 40 |
| Reference Example 9 | Resin K | 95 | C-1 | 5 | 35 | 25 |
| Reference Example 10 | Resin H/ Resin I | 55/40 | C-1 | 5 | 27.5 | 40 |
| Reference Example 11 | Resin H | 85 | C-1 | 15 | 35 | 40 |
| Reference Example 12 | Resin H | 99 | C-1 | 1 | 35 | 40 |
| Reference Example 13 | Resin M | 95 | C-1 | 5 | 0 | 0 |
| Reference Example 14 | — | — | C-1 | 100 | — | 0 |

| | Hydrolysis resistance test | | | |
|---|---|---|---|---|
| | Tg (° C.) before test | Tg (° C.) after test | Difference in Tg (° C.) | Rating |
| Reference Example 1 | 59.2 | 59.1 | −0.1 | A |
| Reference Example 2 | 57.5 | 57.0 | −0.5 | A |
| Reference Example 3 | 57.5 | 57.0 | −0.5 | A |
| Reference Example 4 | 55.1 | 54.0 | −1.1 | B |
| Reference Example 5 | 53.6 | 52.8 | −0.8 | A |
| Reference Example 6 | 51.4 | 50.7 | −0.7 | A |
| Reference Example 7 | 58.1 | 56.2 | −1.9 | B |
| Reference Example 8 | 57.8 | 56.4 | −1.4 | B |
| Reference Example 9 | 57.1 | 54.7 | −2.4 | B |
| Reference Example 10 | 57.6 | 56.8 | −0.8 | A |
| Reference Example 11 | 50.1 | 48.0 | −2.1 | B |
| Reference Example 12 | 58.6 | 58.2 | −0.4 | A |
| Reference Example 13 | 59.6 | 50.3 | −9.3 | D |
| Reference Example 14 | — | — | — | — |

Note:
[1)]Content of alkenyl succinic acid in amorphous resin on the basis of a total amount of whole carboxylic acids (mol %)

Example 12

Two hundred grams of the polyester resin A and 100 g of a nonionic surfactant polyoxyethylene lauryl ether (EO added: 9 mol); cloud point: 98° C.; HLB: 15.3) were melted at 170° C. in a 5 L stainless steel container while stirring with a paddle-shaped stirrer at a rate of 200 r/min. The contents of the container were stabilized at 95° C. which was lower by 3° C. than the cloud point of the nonionic surfactant, and 75.5 g of an aqueous sodium hydroxide solution (concentration: 5% by weight) as a neutralizing agent was dropped thereto while stirring with a paddle-shaped stirrer at a rate of 200 r/min. Subsequently, deionized water was dropped at a rate of 6 g/min in a total amount of 1624.5 g to the obtained mixture while stirring with the paddle-shaped stirrer at a rate of 300 r/min. During the dropping, the temperature of the reaction system was kept at 95° C. Then, the reaction mixture was passed through a wire mesh having a 200 mesh screen (opening: 105 μm) to obtain a resin dispersion containing fine resin particles. The resin particles (primary particles) in the resultant resin dispersion had a volume-median particle size ($D_{50}$) of 0.45 μm, and a solid content of the resin dispersion was 12.0% by weight. No resin components remained on the wire mesh.

Four hundred grams of the thus obtained resin dispersion (concentration: 12.3% by weight), 40 g of a water dispersion containing a cyan pigment (concentration: 5% by weight) and 7 g of a water dispersion containing a paraffin wax ("HNP-9" available from Nippon Seiroh Co., Ltd.; melting point: 78° C.) (concentration: 35% by weight; 5% by weight of "EMULGEN 108" available from Kao Corp. as a nonionic surfactant; diameter of dispersed wax particles (volume-median particle size): 0.30 μm) were mixed with each other at room temperature in a 1 L container.

Next, the thus obtained mixture was mixed with an aqueous solution containing 1 g of calcium chloride as an aggregating agent and then with an aqueous sodium carbonate solution (concentration: 10% by weight) to adjust a pH thereof to 7, and stirred at room temperature for 1 h using a homomixer at a rotating speed of 5000 rpm. The resultant mixed dispersion was transferred to a 1 L autoclave, heated to 90° C. and stirred at 500 rpm for 6 h to form aggregated particles.

Thereafter, the dispersion was heated to 100° C. and further stirred for 1 h to unify the aggregated particles, and then the resultant mixture were subjected to a suction filtration step, a washing step and a drying step to obtain fine colored resin particles. The thus obtained fine colored resin particles had a volume-median particle size ($D_{50}$) of 6.8 μm and a water content of 0.3% by weight.

One part by weight of a hydrophobic silica ("TS530" available from Wacker Chemie Inc.; number-average particle size: 8 nm) was mixed with and externally added to 100 parts by weight of the thus obtained fine colored resin particles using a Henschel mixer to obtain a cyan toner. The resulting cyan toner had a volume-median particle size ($D_{50}$) of 6.8 μm.

Example 13

A 5 L container equipped with a stirrer, a reflux condenser, a dropping funnel, a thermometer and a nitrogen feed pipe was charged with 600 g of methyl ethyl ketone, and then 200 g of the polyester resin B was added to the container at room temperature and dissolved. The obtained solution was neutralized by adding 10 g of triethylamine thereto. Then, the solution was mixed with 2000 g of ion-exchanged water, and distilled while stirring at a rate of 250 rpm under reduced pressure at a temperature of 50° C. or lower to remove methyl ethyl ketone therefrom, thereby obtaining a self-dispersible water-based dispersion of resin particles (resin content: 9.6% by weight in terms of solid components). As a result, it was confirmed that the polyester particles dispersed in the thus obtained resin dispersion had a weight-average particle size of 0.3 μm.

Fifty grams of copper phthalocyanine available from Dai-Nichi Seika Co., Ltd., 5 g of a nonionic surfactant "EMULGEN 150" available from Kao Corp., and 200 g of ion-exchanged water were mixed with each other to dissolve the copper phthalocyanine. The resultant solution was dispersed for 10 min using a homogenizer, thereby obtaining a colorant dispersion.

A mixture composed of 50 g of a paraffin wax "HNP0190" (melting point: 85° C.) available from Nippon Seiroh Co., Ltd., 5 g of a cationic surfactant "SUNYZOLE B50" available from Kao Corp., and 200 g of ion-exchanged water was heated to 95° C. and sired using a homogenizer to disperse the paraffin wax therein. The resultant dispersion was further dispersed using a pressure-discharge type homogenizer to obtain a wax dispersion in which the paraffin wax having an average particle size of 550 nm was dispersed.

Fifty grams of a charge controlling agent "BONTRONE E-84" available from Orient Kagaku Kogyo Co., Ltd., 5 g of a nonionic surfactant "EMULGEN 150" available from Kao Corp., and 200 g of ion-exchanged water were mixed with each other. The resultant mixture was dispersed with glass beads using a sand grinder for 10 min to prepare a dispersion in which the charge controlling agent having an average particle size of 500 nm was dispersed. However, residual coarse particles were observed in the resultant dispersion.

Four hundred ninety grams of the resin particle dispersion, 20 g of the colorant dispersion, 15 g of the wax dispersion, 7 g of the charge controlling agent dispersion and 2 g of a cationic surfactant "SUNYZOLE B50" available from Kao Corp., were charged into a stainless steel round flask, and mixed with each other and dispersed in the flask using a homogenizer. Thereafter, the contents of the flask were heated to 48° C. while stirring in a heating oil bath, and further allowed to stand at 48° C. for 1 h. As a result, it was confirmed that aggregated particles having a weight-average particle size of 7.0 μm were formed.

Three grams of an anionic surfactant "PELLEX SS-L" available from Kao Corp., was added to the dispersion containing the aggregated particles. After fitting a reflux tube to the stainless steel flask, the contents of the flask were heated to 80° C. at a rate of 5° C./min while continuously stirring, and allowed to stand for 5 h to unify and fuse the aggregated particles. Thereafter, the dispersion was cooled and filtered to separate the fused particles therefrom. The thus separated particles were fully washed with ion-exchanged water and then dried, thereby obtaining fine colored resin particles having a volume median particle diameter ($D_{50}$) of 7.1 μm.

One part by weight of a hydrophobic silica ("TS530" available from Wacker Chemie Inc.; number-average particle size: 8 nm) was mixed with and externally added to 100 parts by weight of the thus obtained fine colored resin particles using a Henschel mixer to obtain a cyan toner. The resulting cyan toner had a volume-median particle size ($D_{50}$) of 7.1 μm.

Example 14

One hundred parts by weight of the polyester resin C, 4.0 parts by weight of a yellow colorant "PARIOTROLE D1155" available from BASF AG, 2.5 parts by weight of a charge controlling agent "BONTRONE E-84" available from Hodogaya Kagaku Kogyo Co., Ltd., and 4 parts by weight of a paraffin wax "HNP-9" (melting point: 78° C.) available from Nippon Seiroh Co., Ltd., were previously mixed with each other using a Henschel mixer, melt-kneaded using an open roll-type kneader, and then cooled and pulverized, thereby obtaining a kneaded material in the form of 1 mm chips.

Two hundred grams of the thus obtained kneaded material, 100 g of a nonionic surfactant (polyoxyethylene lauryl ether (EO added: 9 mol); cloud point: 98° C.; HLB: 15.3) were melted at 170° C. in a 5 L stainless steel container while stirring with a paddle-shaped stirrer at a rate of 200 r/min. The contents of the container were stabilized at 95° C. which was lower by 3° C. than the cloud point of the nonionic surfactant, and 75.5 g of an aqueous sodium hydroxide solution (concentration: 5% by weight) as a neutralizing agent was dropped thereto while stirring with a paddle-shaped stirrer at a rate of 200 r/min. Subsequently, deionized water was dropped at a rate of 6 g/min in a total amount of 1624.5 g to the obtained mixture while stirring with the paddle-shaped stirrer at a rate of 300 r/min. During the dropping, the temperature of the reaction system was kept at 95° C. Then, the reaction mixture was passed through a wire mesh having a 200 mesh screen (opening: 105 μm) to obtain a resin dispersion containing fine resin particles. The resin particles in the resultant resin dispersion had a volume-median particle size ($D_{50}$) of 0.45 μm, and a solid content of the resin dispersion was 12.0% by weight. No resin components remained on the wire mesh.

Next, the thus obtained mixture was mixed with an aqueous solution containing 1 g of calcium chloride as an aggregating agent and then with an aqueous sodium carbonate solution (concentration: 10% by weight) to adjust a pH thereof to 7, and stirred at room temperature for 1 h using a homomixer at a rotating speed of 5000 rpm. The resultant mixed dispersion was transferred to a 1 L autoclave, heated to 105° C. and stirred at 500 rpm for 6 h to form aggregated particles.

Thereafter, the dispersion was heated to 125° C. and further stirred for 1 h to unify the aggregated particles, and then the resultant mixture were subjected to a suction filtration step, a washing step and a drying step to obtain fine colored resin particles. The thus obtained fine colored resin particles had a volume-median particle size ($D_{50}$) of 6.7 μm and a water content of 0.3% by weight.

One part by weight of a hydrophobic silica ("TS530" available from Wacker Chemie Inc.; number-average particle size: 8 nm) was mixed with and externally added to 100 parts by weight of the thus obtained fine colored resin particles using a Henschel mixer to obtain a yellow toner. The resulting yellow toner had a volume-median particle size ($D_{50}$) of 6.8 μm.

Example 15

The same procedure as in Example 12 was repeated except for using 100 parts by weight of the polyester resin D in place of the polyester resin A, thereby obtaining a cyan toner. As a result, it was confirmed that the thus obtained cyan toner had a volume-median particle size ($D_{50}$) of 6.7 μm.

Example 16

The same procedure as in Example 12 was repeated except for using 100 parts by weight of the polyester resin E in place of the polyester resin A, thereby obtaining a cyan toner. As a result, it was confirmed that the thus obtained cyan toner had a volume-median particle size ($D_{50}$) of 6.8 μm.

Example 17

The same procedure as in Example 12 was repeated except for using 100 parts by weight of the polyester resin F in place of the polyester resin A, thereby obtaining a cyan toner. As a result, it was confirmed that the thus obtained cyan toner had a volume-median particle size ($D_{50}$) of 6.7 μm.

Example 18

The same procedure as in Example 12 was repeated except for using 100 parts by weight of the polyester resin G in place of the polyester resin A, thereby obtaining a cyan toner. As a result, it was confirmed that the thus obtained cyan toner had a volume-median particle size ($D_{50}$) of 6.8 μm.

Comparative Example 3

The same procedure as in Example 12 was repeated except for using 100 parts by weight of the polyester resin H in place of the polyester resin A, thereby obtaining a cyan toner. As a result, it was confirmed that the thus obtained cyan toner had a volume-median particle size ($D_{50}$) of 6.8 μm.

Example 19

Five hundred seventy grams of the polyester resin H and 30 g of the polyester resin C-1 were mixed with each other and melted at 98° C. While stirring the obtained molten resin with a paddle-shaped stirrer at a rate of 300 r/min, 281 g of an aqueous sodium hydroxide solution (concentration: 5% by weight) was dropped thereto at a rate of 6 g/min. Subsequently, deionized water was dropped at a rate of 6 g/min to the obtained reaction solution. When dropping about 30 g of the deionized water, emulsification of the reaction solution was initiated, and when dropping about 300 g of the deionized water, the reaction solution was substantially completely emulsified. The dropping of the deionized water was further continued until a total amount of the deionized water added to the reaction solution reached 2133 g. During the dropping, the temperature of the reaction system was kept at 98° C. to obtain a resin dispersion. The resin particles contained in the resultant resin dispersion had a volume-median particle size ($D_{50}$) of 0.37 μm.

Five hundred grams of the thus obtained resin dispersion, 20 g of the colorant dispersion produced in Example 13, 15 g of the wax dispersion produced in Example 13, 7 g of the charge controlling agent dispersion produced in Example 13 and 2 g of a cationic surfactant “SUNNYSOL B50” available from Kao Corp., were charged into a round flask made of stainless steel and mixed and dispersed together therein using a homogenizer. Thereafter, the contents of the flask were heated to 48° C. while stirring in a heating oil bath, and further maintained at 48° C. for 1 h. As a result, it was confirmed that aggregated particles having a volume-median particle size ($D_{50}$) of 7.0 μm were formed.

The resultant dispersion containing the aggregated particles was mixed with 3 g of an anionic surfactant “PELEX SS-L” available from Kao Corp. After fitting a reflux tube to the stainless steel flask, the obtained mixture was heated to 80° C. at a rate of 5° C./min while continuously stirring, and then allowed to stand for 5 h, thereby unifying and fusing the aggregated particles together. After cooling the obtained mixture, the fused particles were filtered, sufficiently washed with ion-exchanged water and then dried, thereby obtaining fine colored resin particles. The thus obtained fine colored resin particles had a volume-median particle size ($D_{50}$) of 6.5 μm.

One part by weight of a hydrophobic silica (“TS530” available from Wacker Chemie Inc.; number-average particle size: 8 nm) was externally added to 100 parts by weight of the thus obtained fine colored resin particles and mixed therein using a Henschel mixer, thereby obtaining a cyan toner. The resulting cyan toner had a volume-median particle size ($D_{50}$) of 6.5 μm.

Example 20

A 5 L container equipped with a stirrer, a reflux condenser, a dropping funnel, a thermometer and a nitrogen feed pipe was charged with 1200 g of methyl ethyl ketone, and then 380 g of the polyester resin H and 20 g of the polyester resin C-1 were added to the container and dissolved at 50° C. The obtained solution was neutralized by adding 10 g of triethylamine thereto. Then, the thus neutralized solution was mixed with 2000 g of ion-exchanged water, and distilled while stirring at a rate of 250 r/min under reduced pressure at a temperature of 50° C. or lower to remove methyl ethyl ketone therefrom, thereby obtaining a self-dispersible water-based resin particle dispersion (resin content: 20.2% by weight in terms of solid components). As a result, it was confirmed that the polyester particles dispersed in the thus obtained resin dispersion had a volume-median particle size ($D_{50}$) of 0.3 μm.

Subsequently, the agglomerating and unifying procedures were carried out in the same manner as in Example 19, thereby obtaining a cyan toner. The resulting cyan toner had a volume-median particle size ($D_{50}$) of 7 μm.

Examples 21 to 30 and Comparative Examples 4 and 5

The same procedure as in Example 19 was repeated except of replacing the polyester resins with those with mixing ratios as shown in Table 10, thereby obtaining respective cyan toners.

Next, the respective toners obtained in Examples 12 to 30 and Comparative Examples 3 to 5 were subjected to the following storage stability test and low-temperature fixing property test. The results are shown in Table 9.

(Storage Stability Test)

Four grams of the respective toners were charged into an open-type cylindrical container having a diameter of 5 cm and a height of 2 cm, and allowed to stand at a temperature of 55° C. and a humidity of 60% for 72 h. After the standing, the degree of aggregation of the respective toners was observed by naked eyes to evaluate a storage stability of the toners according to the following evaluation criteria.

Evaluation Criteria

A: No aggregation of toner was recognized even after 72 h;

B: Substantially no aggregation of toner was recognized after 72 h;

C: No aggregation of toner was recognized after 48 h, but aggregation of toner was recognized after 72 h; and D: Aggregation of toner was already recognized after 48 h.

(Low-Temperature Fixing Property Test)

The toner was charged into a printer “PAGE-PRESTO N-4” (available from Casio Keisanki Co., Ltd.; fixing system: contact fixing; developing system: non-magnetic one component development: diameter of developing roll: 2.3 cm) to obtain an unfixed image by adjusting an amount of the toner adhered to 0.6 mg/cm$^2$. Using a fixing device obtained by modifying a fixing unit of a contact developing type copying machine “AR-505” available from Sharp Corp., such that a fixing operation thereof was possible even outside of the machine, the thus obtained unfixed toner image was fixed at a rate of 300 mm/s while raising a temperature of a fixing roll at intervals of 10° C. from 100° C. to 240° C. to thereby carry out the fixing property test.

Specifically, an adhesive tape “UNICEF CELLOPHANE” (available from Mitsubishi Pencil Co., Ltd.; width: 18 mm: JIS Z-1522) was attached onto the toner image obtained at the respective firing temperatures, and passed through the fixing roll of the fixing device adjusted to 30° C. Then, the tape was peeled off from the toner image to measure an optical reflection density thereof before and after peeling off the tape, using a reflection-type densitometer “RD-914” available from Macbeth Corp. From the thus measured values, a minimum fig temperature of the toner was determined as a fixing roll temperature at which a ratio in optical reflection density of the toner image between before and after peeling off the tape (after peeling/before peeling) first exceeded 95%. The minimum fixing temperature was examined to evaluate a low-temperature fixing property of the toner according to the following evaluation criteria.

Evaluation Criteria

A: Minimum fixing temperature was lower than 140° C.;

B: Minimum fixing temperature was not lower than 140° C. but lower than 150° C.;

C: Minimum fixing temperature was not lower than 150° C. but lower than 160° C.;

D: Minimum fixing temperature was not lower than 160° C. but lower than 170° C.;

E: Minimum fixing temperature was not lower than 170° C. but lower than 180° C.; and F: Minimum fixing temperature was not lower than 180° C.

TABLE 9

| | Amorphous resin | | Resin binder | |
|---|---|---|---|---|
| | Kind | wt % | Kind | wt % |
| Example 12 | Resin A | 100 | — | 0 |
| Example 13 | Resin B | 100 | — | 0 |
| Example 14 | Resin C | 100 | — | 0 |
| Example 15 | Resin D | 100 | — | 0 |
| Example 16 | Resin E | 100 | — | 0 |
| Example 17 | Resin F | 100 | — | 0 |
| Example 18 | Resin G | 100 | — | 0 |
| Comparative Example 3 | Resin H | 100 | — | 0 |
| Example 19 | Resin A | 95 | C-1 | 5 |
| Example 20 | Resin H | 95 | C-1 | 5 |
| Example 21 | Resin H | 95 | C-1 | 5 |
| Example 22 | Resin H | 95 | C-2 | 5 |
| Example 23 | Resin H | 95 | C-3 | 5 |
| Example 24 | Resin H | 95 | C-4 | 5 |
| Example 25 | Resin I | 95 | C-1 | 5 |
| Example 26 | Resin J | 95 | C-1 | 5 |
| Example 27 | Resin K | 95 | C-1 | 5 |
| Example 28 | Resin H/ Resin I | 55/40 | C-1 | 5 |
| Example 29 | Resin H | 85 | C-1 | 15 |
| Example 30 | Resin H | 99 | C-1 | 1 |
| Comparative Example 4 | Resin M | 95 | C-1 | 5 |
| Comparative Example 5 | — | — | C-1 | 100 |

| | Toner | | | | |
|---|---|---|---|---|---|
| | Particle size ($D_{50}$) (μm) | Softening point (° C.) | Glass transition point (° C.) | Storage stability | Fixing test |
| Example 12 | 6.8 | 120.6 | 60.5 | A | C |
| Example 13 | 7.1 | 131.4 | 65.0 | A | D |
| Example 14 | 6.8 | 137.5 | 60.2 | B | C |
| Example 15 | 6.7 | 103.9 | 59.1 | A | D |
| Example 16 | 6.8 | 101.9 | 62.1 | B | D |
| Example 17 | 6.7 | 124.3 | 61.3 | B | D |
| Example 18 | 6.8 | 100.3 | 58.8 | C | D |
| Comparative Example 3 | 6.8 | 131.1 | 57.8 | D | E |
| Example 19 | 6.5 | 120.5 | 59.0 | A | A |
| Example 20 | 7.0 | 115.3 | 59.8 | A | A |
| Example 21 | 6.9 | 115.0 | 59.5 | A | A |
| Example 22 | 7.2 | 112.4 | 57.9 | B | B |
| Example 23 | 7.1 | 109.4 | 57.6 | B | A |
| Example 24 | 7.1 | 107.6 | 56.8 | B | A |
| Example 25 | 6.7 | 105.4 | 59.7 | A | B |
| Example 26 | 7.2 | 127.6 | 57.7 | B | B |
| Example 27 | 7.2 | 107.7 | 55.3 | C | C |
| Example 28 | 7.0 | 113.1 | 59.0 | B | A |
| Example 29 | 7.1 | 107.2 | 56.4 | C | A |
| Example 30 | 7.1 | 116.9 | 59.4 | A | B |
| Comparative Example 4 | 6.9 | 102.5 | 50.1 | D | E |
| Comparative Example 5 | 7.4 | 85.1 | — | D | A |

From the above results, it was conformed that the polyesters using the alkenyl succinic acid according to the present invention (Examples 1 to 11) were effectively prevented from suffering from decrease in glass transition point even when heated in the presence of an alkali in a solution and, therefore, exhibited a high hydrolysis resistance, in particular, the polyesters using the alkenyl succinic acid containing a branched alkenyl group and having 20 or more peaks as measured by gas chromatography/mass spectrometry (Examples 1 to 5 and 8) exhibited a more remarkable effect of enhancing a hydrolysis resistance. In addition, it was confirmed that the toner produced using the polyester of the present invention satisfied both a storage stability and a low-temperature fixing property which were contradictory to each other. On the other hand, it was confirmed that the polyester using no alkenyl succinic acid (Comparative Examples 1 and 2) suffered from significant reduction in glass transition point, and the toner containing the polyester was deteriorated in both storage stability and fixing property.

What is claimed is:

1. A polyester for a toner for electrophotography which is used in a process for producing the toner including a step of forming a raw material containing a resin binder containing the polyester into particles in an aqueous medium, wherein the polyester is produced by polycondensing an alcohol component with a carboxylic acid component containing (A) at least two alkyl succinic acids each containing a branched alkyl group having 9 to 14 carbon atoms, (B) at least two alkenyl succinic acids each containing a branched alkenyl group having 9 to 14 carbon atoms, or both the components (A) and (B).

2. The polyester according to claim 1, wherein the carboxylic acid component contains at least twenty structural isomers selected from the group consisting of structural isomers of an alkyl succinic acid containing a branched alkyl group having 9 to 14 carbon atoms, and structural isomers of an alkenyl succinic acid containing a branched alkenyl group having 9 to 14 carbon atoms.

3. The polyester according to claim 1, wherein the at least one compound selected from the group consisting of an alkyl succinic acid and an alkenyl succinic acid is a compound produced from an alkylene compound and at least one compound selected from the group consisting of maleic acid and fumaric acid, and the alkylene compound has at least 20 peaks corresponding to alkylene compounds having 9 to 14 carbon atoms as measured by gas chromatography/mass spectrometry.

4. The polyester according to claim 1, wherein a total content of the alkyl succinic acid and the alkenyl succinic acid in the carboxylic acid component is from 3 to 50 mol %.

5. The polyester according to claim 1, wherein the polyester has an acid value of 1 to 40 mg KOH/g.

6. A toner for electrophotography comprising the polyester as defined in claim 1.

7. A toner for electrophotography which is produced by a process comprising the step of forming a raw material component containing a resin binder into particles in an aqueous medium, wherein the resin binder contains the polyester as defined in claim 1, and a crystalline polyester.

8. The toner for electrophotography according to claim 7, wherein a content of the crystalline polyester in the resin binder is from 1 to 20% by weight.

9. A method of using the polyester as defined in claim 1 in a toner for electrophotography.

10. A method of using the toner as defined in claim 6 for electrophotography.

11. A method of using the toner as defined in claim 7 for electrophotography.

12. A process for producing the polyester as defined in claim 1, comprising the step of polycondensing an alcohol component with a carboxylic acid component containing at least twenty structural isomers selected from the group consisting of structural isomers of an alkyl succinic acid containing a branched alkyl group having 9 to 14 carbon atoms, and structural isomers of an alkenyl succinic acid containing a branched alkenyl group having 9 to 14 carbon atoms.

13. A process for producing a toner for electrophotography, comprising the steps of (1) forming primary particles containing a resin binder containing the polyester as defined in claim 1 in the presence of a nonionic surfactant in an aqueous medium; and (2) aggregating and unifying the primary particles.

* * * * *